United States Patent [19]
Negishi et al.

[11] Patent Number: 5,285,257
[45] Date of Patent: Feb. 8, 1994

[54] OPTIC ROTATION SENSING APPARATUS AND RELATED METHOD INCLUDING PROVIDING SYNCHRONOUS DETECTION AT A PHASE AT WHICH THE AM NOISE IS MINIMIZED

[75] Inventors: Hidehiko Negishi, Kawasaki; Yoshinori Takeuchi; Yuko Takei, both of Tokyo; Yoshihiko Honjoya, Kawasaki, all of Japan

[73] Assignee: Matsushita Electric Industrial Co., Ltd., Osaka, Japan

[21] Appl. No.: 29,281

[22] Filed: Mar. 8, 1993

Related U.S. Application Data

[63] Continuation of Ser. No. 735,725, Jul. 25, 1991, abandoned.

[30] Foreign Application Priority Data

| Mar. 1, 1991 | [JP] | Japan | 3-035886 |
| May 22, 1991 | [JP] | Japan | 3-117275 |
| Jun. 26, 1991 | [JP] | Japan | 3-154261 |
| Jun. 26, 1991 | [JP] | Japan | 3-154420 |

[51] Int. Cl.$^5$ ............................................. G01C 19/72
[52] U.S. Cl. ............................................. 356/350
[58] Field of Search ............................................. 356/350, 345; 250/227.27, 227.19; 385/12, 14

[56] References Cited

U.S. PATENT DOCUMENTS

| 4,013,365 | 3/1977  | Vali et al.     |         |
| 4,712,306 | 12/1987 | Cahill et al.   | 356/350 |
| 4,871,254 | 10/1989 | Lefevre et al.  | 356/350 |
| 4,883,358 | 11/1989 | Okada           | 356/350 |
| 4,998,822 | 3/1991  | Steele          |         |

FOREIGN PATENT DOCUMENTS

| 0074465  | 3/1983 | European Pat. Off. |
| 0409375  | 1/1991 | European Pat. Off. |
| 3401640  | 7/1984 | Fed. Rep. of Germany |
| 4000800  | 8/1990 | Fed. Rep. of Germany |
| 64-74410 | 3/1989 | Japan |

OTHER PUBLICATIONS

"Ring Interferometer 950 m long", Vari, et al, 1977 Optical Society of America, Reprinted by Permission of the Publisher from Applied Optics, vol. 16(2), pp. 290-291 (1977).

"Low-Drift Fibre Gyro Using a Superluminescent Diode", 1981—The Institution of Electrical Engineers, Reprinted by permission of the publisher from Electronics Letters, vol. 17(10), pp. 352-353 (1981).

"Fiber Ring Interferometer" by V. Vali et al; Optical Society of America, Reprinted by permission of the publisher from Applied Optics; vol. 15(5), 1099-1100 (1976).

"All-Single-Mode Fiber-Optic Gyroscope with Long-Term Stability" by R. A. Bergh et al. Optical Society of America, Reprinted by permission of the publisher from Optics Letters; vol. 6(10), 502-504 (1981).

"Fiber-Optic Rotation Sensing With Low Dirft" by R. Ulrich Optical Society of America, Reprinted by permission of the publisher from Optics Letters; vol. 5(5), 173-175 (1980).

*Primary Examiner*—Samuel A. Turner
*Attorney, Agent, or Firm*—Lowe, Price, LeBlanc & Becker

[57] ABSTRACT

An optic rotation sensing apparatus includes a light source emitting light. The light emitted from the light source is transmitted to a sensing loop which provides a phase difference between opposite-direction light waves in response to a rotation. Return light outputted from the sensing loop is transmitted to a photodetector. A device modulates a phase of light propagating in the sensing loop. Another device depolarizes light propagating in the sensing loop. The invention further controls and processes an output signal representing the output of the photodetector at a phase at which a level of an AM noise component of the output signal is minimized.

30 Claims, 17 Drawing Sheets

OPTIC ROTATION SENSING APPARATUS AND RELATED METHOD INCLUDING PROVIDING SYNCHRONOUS DETECTION AT A PHASE AT WHICH THE AM NOISE IS MINIMIZED

This application is a continuation of Application Ser. No. 07/735,725 filed Jul. 25, 1991 now abandoned.

BACKGROUND OF THE INVENTION

This invention relates to an optic rotation sensing apparatus such as a fiber-optic gyroscope. This invention also relates to a method related to an optic rotation detecting apparatus.

Various fiber-optic gyroscopes have been developed. For example, U.S. Pat. No. 4,013,365 discloses a basic fiber-optic gyroscope. In addition, U.S. Pat. No. 4,998,822 discloses an advanced fiber-optic gyroscope. Signal processing used in fiber-optic gyroscopes is of the phase-difference bias type, the two-input type, the phase-modulation type, the frequency-modulation type, and others. As will be explained later, a prior art fiber-optic gyroscope of the phase-modulation type has some problems.

SUMMARY OF THE INVENTION

It is an object of this invention to provide an improved optic rotation sensing apparatus.

It is another object of this invention to provide an improved method in an optic rotation sensing apparatus.

A first aspect of this invention provides an optic rotation sensing apparatus comprising a light source emitting light; a sensing loop; means for transmitting the light from the light source to the sensing loop; a photodetector; means for transmitting light from the sensing loop to the photodetector; means for modulating a phase of light propagating in the sensing loop; and means for depolarizing light propagating in the sensing loop.

A second aspect of this invention provides an optic rotation sensing apparatus comprising a light source emitting light; a first coupler separating the light emitted from the light source into two light beams, the first coupler including single-mode optical fibers; a laminated-type polarizer; means for transmitting one of the light beams to the polarizer; a second coupler separating light outputted from the polarizer into two light beams, the second coupler including single-mode optical fibers; a sensing loop having a point-symmetrical configuration and including a single-mode optical fiber; means for transmitting one of the light beams from the second coupler to the sensing loop; a photodetector; means for transmitting return light from the sensing loop to the first coupler via the second coupler and the polarizer, wherein the polarizer separates the return light into two return light beams; means for transmitting one of the two return light beams from the first coupler to the photodetector; means for modulating a phase of light propagating in the sensing loop, the modulating means including a cylindrical piezoelectric element and an optical fiber of a polarization-plane conservative type which is wound on the piezoelectric element; and means for depolarizing light propagating in the sensing loop, the depolarizing means including two optical fibers of a polarization-plane conservative type, wherein a length of one of the two optical fibers of the depolarizing means is equal to twice a length of the other of the two optical fibers of the depolarizing means, and wherein the two optical fibers of the depolarizing means are connected in a manner such that main axes of the two optical fibers incline to each other at an angle of 45 degrees.

A third aspect of this invention provides an optic rotation sensing apparatus comprising a light source emitting light; a sensing loop; means for transmitting the light from the light source to the sensing loop; a photodetector; means for transmitting light from the sensing loop to the photodetector; means for modulating a phase of light propagating in the sensing loop; and means for controlling and processing an output signal from the photodetector at a phase at which a level of a noise component of the output signal from the photodetector is minimized.

A fourth aspect of this invention provides a method comprising the steps of feeding light to a sensing loop; modulating a phase of light in the sensing loop; converting return light outputted from the sensing loop into a corresponding electric signal; and controlling and processing the electric signal at a phase at which a level of a noise component of the electric signal is minimized.

A fifth aspect of this invention provides a method comprising the steps of feeding light to a sensing loop; modulating a phase of light in the sensing loop; converting return light outputted from the sensing loop into a corresponding electric signal; detecting a predetermined phase of the electric signal; detecting a signal component of the electric signal by a sync detection at a phase which is obtained on the basis of the predetermined phase and at which a level of a noise component of the electric signal is minimized; generating a signal including a reference signal used by the sync detection; and varying a phase of the reference signal on the basis of the predetermined phase detected by the phase detecting step, and controlling the sync detection so that the signal component of the electric signal is detected at a phase at which the level of the noise component of the electric signal is minimized.

A sixth aspect of this invention provides a method comprising the steps of feeding light to a sensing loop; modulating a phase of light in the sensing loop; converting return light outputted from the sensing loop into a corresponding electric signal; detecting a predetermined phase of a harmonic component of the electric signal; detecting a signal component of the electric signal by a sync detection at a phase which is obtained on the basis of the predetermined phase and at which a level of a noise component of the electric signal is minimized; generating a signal including a reference signal used by the sync detection; and varying a phase of the signal generated by the generating step on the basis of the predetermined phase detected by the phase detecting step, and controlling the phase modulating step so that the signal component of the electric signal is detected by the sync detection at a phase at which the level of the noise component of the electric signal is minimized.

A seventh aspect of this invention provides a method comprising the steps of feeding light to a sensing loop; modulating a phase of light in the sensing loop; converting return light outputted from the sensing loop into a corresponding electric signal; detecting a predetermined phase of a harmonic component of the electric signal; detecting a signal component of the electric signal by a sync detection at a phase which is obtained on the basis of the predetermined phase and at which a level of a noise component of the electric signal is minimized; generating a signal including a reference signal used by the sync detection; and varying a frequency of the reference signal on the basis of the predetermined phase detected by the phase detecting step, and controlling the signal generating step so that the signal component of the electric signal is detected by the sync detection at a phase at which the level of the noise component of the electric signal is minimized.

An eighth aspect of this invention provides a method comprising the steps of feeding light to a sensing loop; modulating a phase of light in the sensing loop; converting return light outputted from the sensing loop into a corresponding electric signal; detecting a predetermined phase at which a magnitude of the electric signal is equal to a predetermined magnitude by a first sync detection, and detecting a phase at which a level of a noise component of the electric signal is minimized; detecting a signal component of the electric signal by a second sync detection at a phase which is obtained on the basis of the predetermined phase and at which a level of a noise component of the electric signal is minimized; generating a signal including a reference signal used by the second sync detection; and varying a phase of the signal generated by the generating step on the basis of the predetermined phase detected by the phase detecting step, and controlling the phase modulating step so that the signal component of the electric signal is detected by the second sync detection at a phase at which the level of the noise component of the electric signal is minimized.

A ninth aspect of this invention provides a method comprising the steps of feeding light to a sensing loop; modulating a phase of light in the sensing loop; depolarizing light in the sensing loop; converting return light outputted from the sensing loop into a corresponding electric signal; and controlling and processing the electric signal at a phase at which a level of a noise component of the electric signal is minimized.

DESCRIPTION OF THE PRIOR ART

Figures 1, 2:
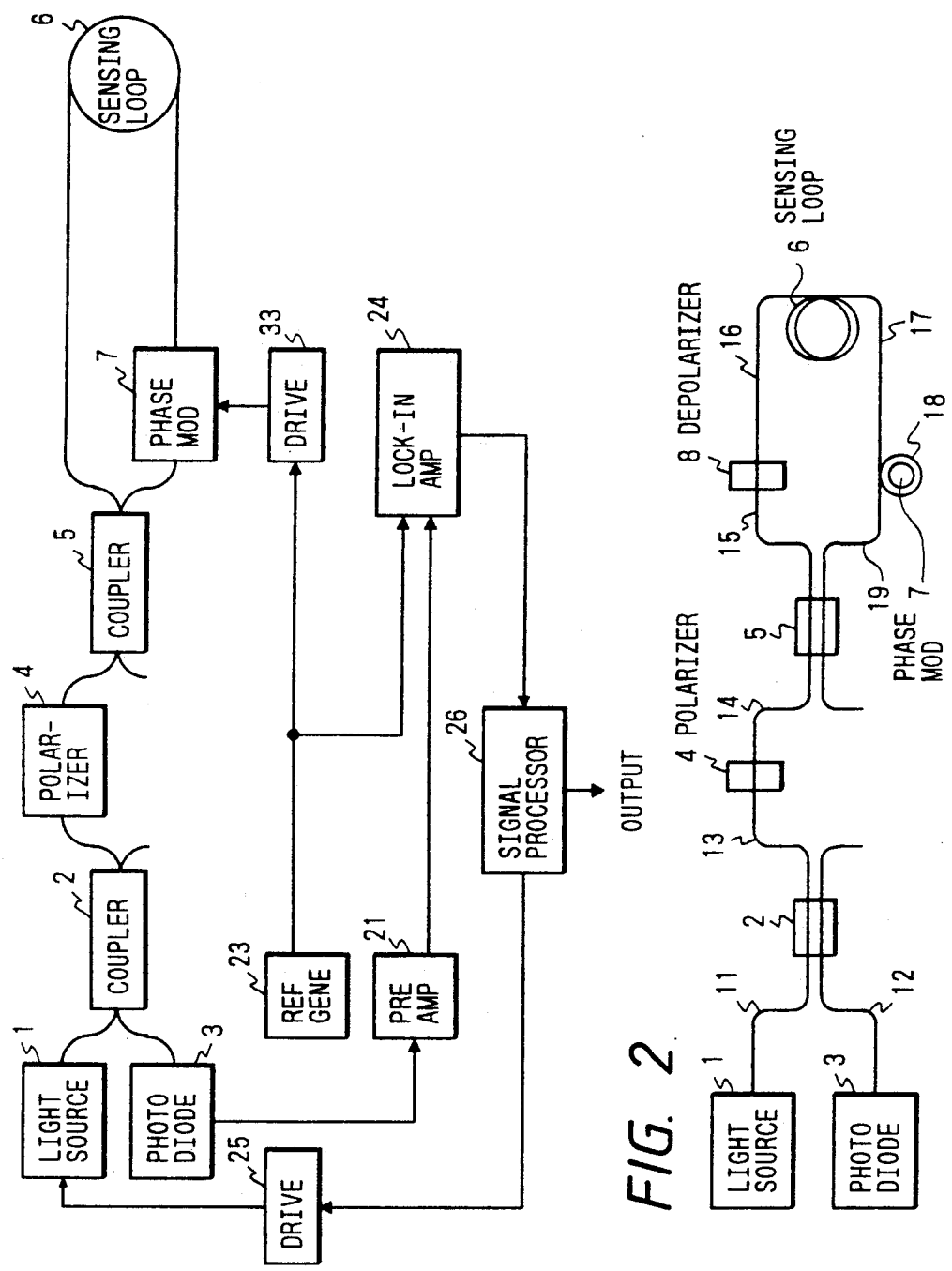
FIG. 1 is a diagram of a prior art fiber-optic gyroscope.
FIG. 2 is a diagram of a fiber-optic gyroscope according to a first embodiment of this invention.

With reference to FIG. 1, a prior art fiber-optic gyroscope includes a light source 1 such as a semiconductor laser. Light emitted from the light source 1 is transmitted via a first fiber-optic coupler 2 to a polarizer 4. After the light passes through the polarizer 4, the light is transmitted via a fiber-optic mode filter to a second fiber-optic coupler 5 forming a beam splitter.

The light is separated by the beam splitter 5 into two beams which couple with two ends of an optical fiber 6 respectively. The optical fiber 6 forms a sensing loop. A part of the optical fiber 6 which extends between one end and the sensing loop is associated with phase modulator 7 including a piezoelectric element. One of the two light beams propagates through the sensing loop 6 in the clockwise (CW) direction, and the other light beam propagates through the sensing loop 6 in the counterclockwise (CCW) direction. Then, the two light beams are combined by the beam splitter 5 into a single return light beam. The return light beam is transmitted via the polarizer 4 and the first fiber-optic coupler 2 to a photodetector 3 such as a photodiode, being converted by the photodetector 3 into a corresponding electric signal.

A reference signal generator 23 outputs a reference signal of a predetermined frequency fm to a drive circuit 33. The drive circuit 33 generates a phase modulating signal in correspondence with the reference signal, and feeds the phase modulating signal to the phase modulator 7. The phases of the light beams propagating through the optical fiber are modulated by the phase modulator 7 in accordance with the phase modulating signal. The output signal from the photodetector 3 is fed via a preamplifier 21 to a lock-in amplifier 24. The lock-in amplifier 24 receives the reference signal from the reference signal generator 23. The lock-in amplifier 24 subjects the photodetector output signal to a synchronous detection process by using the reference signal. The output signal from the lock-in amplifier 24 is converted by a signal processor 26 into a signal directly representing the angular velocity of the fiber-optic gyroscope. In addition, the signal processor 26 generates a feedback signal on the basis of the output signal from the lock-in amplifier 24. The feedback signal is fed to a drive circuit 25. The drive circuit 25 drives the light source 1 in response to the feedback signal.

According to the Sagnac effect, the light wave traveling in the direction of a rotation of the sensing loop has a longer transit time through the sensing loop than the light wave traveling opposite to the direction of the rotation. This difference in transit time is seen as a shift in the relative phases of the two light waves. In this way, a rotation of the fiber-optic gyroscope causes a difference in phase between the two light waves, that is, the CW light and the CCW light. The CW light and the CCW light are combined while interfering with each other. The resulting interference light causes a corresponding component of the output signal from the photodetector 3. The phase difference between the CW light and the CCW light is detected by analyzing the component of the output signal from the photodetector 3 which corresponds to the interference light.

It is thought that one noise factor of the fiber-optic gyroscope results from the phase detector 7. To remove this noise factor, the frequency fm of the reference signal or the frequency of the phase modulating signal fed to the phase modulator 7 is generally required to satisfy the following equation.

$$fm = c/(2nL)$$

where "c" denotes the speed of light in a vacuum, and "n" denotes the effective refractive index of the optical fiber 6 and "L" denotes the length of the sensing loop.

As understood from the previously-mentioned equation, a decrease in the length of the sensing loop requires an increase in the frequency fm of the phase modulating signal. In general, increasing the frequency fm of the phase modulating signal is considerably limited. Thus, in the prior art fiber-optic gyroscope of FIG. 1, the length L of the sensing loop tends to be long.

Further, in the prior art fiber-optic gyroscope of FIG. 1, to maintain the direction of the polarization of the incident light, it is desirable that all the optical paths are defined by expensive optical fibers of the polarization-plane conservative type.

DESCRIPTION OF THE PREFERRED EMBODIMENTS

First Embodiment

With reference to FIG. 2, a fiber-optic gyroscope includes a light source 1 using a super luminescence diode (an SLD). Light emitted from the light source 1 is guided to a first optical coupler 2 along an optical path 11 defined by an optical fiber. The first coupler 2 serves as a beam splitter. The light is separated by the first coupler 2 into two light beams having equal intensities. One of the light beams travels from the first coupler 2 to a laminated-type polarizer 4 via an optical path 13 defined by an optical fiber. The polarizer 4 confines the direction of the polarization of the light, and outputs light polarized in one direction. After passing through the polarizer 4, the light travels to a second optical coupler 5 via an optical path 14 defined by an optical fiber. The second coupler 5 serves as a beam splitter.

The light is separated by the beam splitter 5 into two beams, which travel to a depolarizer 8 and a phase modulator 7 via optical paths 15 and 19 defined by optical fibers respectively. The depolarizer 8 serves to convert the polarized light into natural light. After passing through the depolarizer 8, the light beam enters a sensing loop 6 via an optical path 16 and then propagates through the sensing loop 6 in the clockwise (CW) direction. The light traveling through the sensing loop 6 in the CW direction will be referred to as the CW light hereinafter. The optical path 16 and the sensing loop 6 are defined by optical fibers. The CW light exits from the sensing loop 6, and then travels to the phase modulator 7 via an optical path 17 defined by an optical fiber. The CW light propagates through an optical path 18 defined by an optical fiber wound on a piezoelectric element of the phase modulator 7. After exiting from the phase modulator 7, the CW light travels to the second coupler 5 via the optical path 19. The other light beam passes through the optical path 18 within the phase modulator 7, and then travels to the sensing loop 6 via the optical path 17. The light beam enters the sensing loop 6 and propagates through the sensing loop 6 in the counterclockwise (CCW) direction. The light traveling through the sensing loop 6 in the CCW direction will be referred to as the CCW light. The CCW light exits from the sensing loop 6, and then travels to the depolarizer 8 via the optical path 16. The depolarizer 8 converts the light into natural light. After passing through the depolarizer 8, the CCW light travels to the second coupler 5 via the optical path 15.

The CW light and the CCW light are combined by the second coupler 5 into a single return light beam while interfering with each other. After exiting from the second coupler 2, the return light propagates to the first coupler 2 via the optical path 14, the polarizer 4, and the optical path 13. The return light is separated by the first coupler 2 into two light beams, one of which travels from the first coupler 2 to a photodiode 3 via an optical path 12 defined by an optical fiber. The light beam is converted by the photodiode 3 into a corresponding electric signal.

The polarizer 4 is provided for the reason as follows. Generally, two modes of light waves which have orthogonal polarization directions can propagate in an optical fiber. The nonaxisymmetric characteristics of the optical fiber causes an energy coupling between the two orthogonal modes. If the energy coupling conditions change due to a temperature variation or other factors, an error is induced in the output signal from the fiber-optic gyroscope. Specifically, the error causes a drift in the output signal from the fiber-optic gyroscope. A good way of reducing such a drift in the output signal from the fiber-optic gyroscope is to equalize the transfer functions for the CW light and the CCW light. This is realized by the provision of the polarizer 4 in the optical path between the first coupler 2 and the second coupler 5. The polarizer 4 introduces a single polarization component of the forward light into the sensing loop 6, and the introduced light component is separated into the CW light and the CCW light. After traveling through the sensing loop 6, the CW light and the CCW light are combined into the return light. The polarizer 4 passes only a single polarization component of the return light which corresponds to the selected polarization component of the forward light.

The depolarizer 8 is of the Lyot fiber type, including two polarization-plane conservative optical fibers having different lengths. The length of the longer optical fiber is twice the length of the shorter optical fiber. The two optical fibers are connected in such a manner that the main axes of the optical fibers incline to each other at an angle of 45 degrees. The depolarizer 8 produces a difference in optical path length between the orthogonal polarization modes, decreasing an interference between the orthogonal polarization modes. In other words, the depolarizer 8 depolarizes the CW light beam and the CCW light beam into natural light beams, removing unnecessary interference noise component caused by a variation in the polarization conditions in the sensing loop 6. As a result, it is possible to further reduce the drift in the output signal from the fiber-optic gyroscope.

The phase modulator 7 provides an optical phase difference between the CW light and the CCW light.

The phase modulator 7 includes a cylindrical piezoelectric element, and the optical fiber wound around the piezoelectric element and defining the optical path 18. While passing through the optical path 18 in the phase modulator 7, the CW light and the CCW light are subjected to phase modulation. This phase modulation is to increase the sensitivity in the detection of a Sagnac phase difference between the CW light and the CCW light which is caused by a rotation of the fiber-optic gyroscope.

The optical fibers defining the optical paths 11, 12, 13, 14, 15, 16, 17, and 19 are of the single-mode type. The optical fiber defining the optical path 18 is preferably of the polarization-plane conservative type for the following reason. As the phase modulator 7 receives a phase modulation signal, the piezoelectric element in the phase modulator 7 expands and contracts. The expansion and contraction of the piezoelectric element causes a stress in the optical fiber defining the optical path 18. The stress in the optical fiber unsettles the polarization conditions and the intensity of the light beams. In the case where the depolarizer 8 adequately depolarizes the CW light and the CCW light, the optical fiber defining the optical path 18 may be of the single-mode type.

Figure 3:
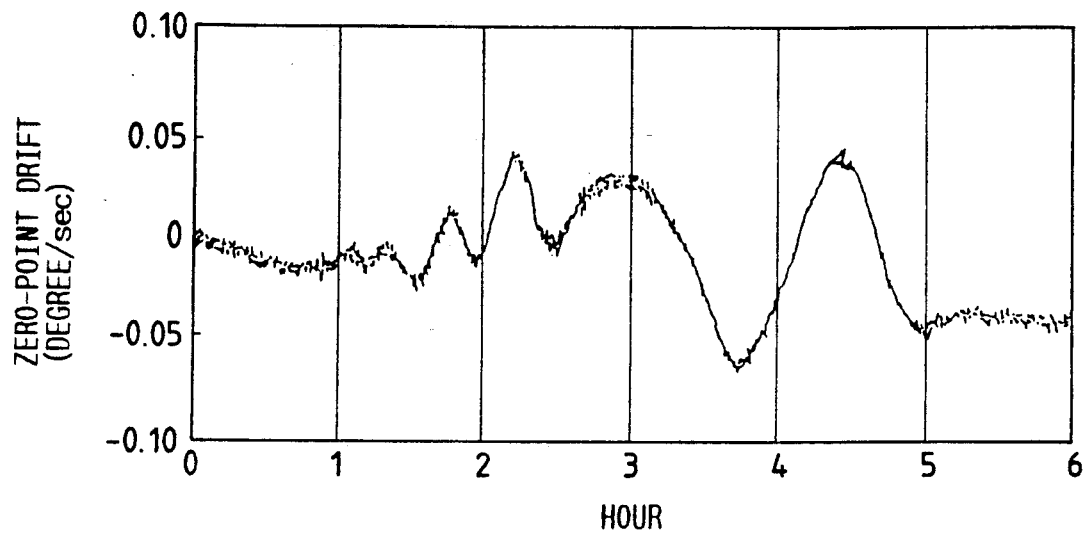
FIG. 3 is a time-domain diagram showing drift characteristics of a zero-point output which is obtained in the absence of a depolarizer.
Figure 4:
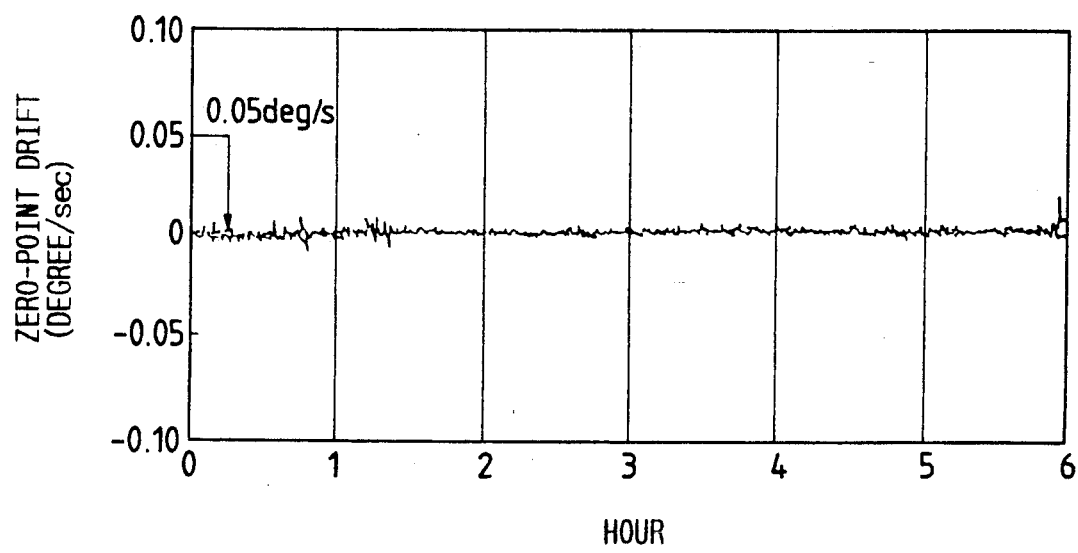
FIG. 4 is a time-domain diagram showing draft characteristics of a zero-point output which is obtained in the presence of a depolarizer.

Experiments were performed on the effect of the depolarizer 8. During the experiments, zero-point drift characteristics of the output signal from the fiber-optic gyroscope were measured in the presence of the depolarizer 8 and in the absence of the depolarizer 8. FIG. 3 shows the experimental results of the time-domain variations in the zero point of the output signal from the fiber-optic gyroscope which were obtained in the absence of the depolarizer 8. As shown in FIG. 3, the drift quantity of the zero point of the output signal from the fiber-optic gyroscope was equal to about 0.1 degree/second in the absence of the depolarizer 8. FIG. 4 shows the experimental results of the time-domain variations in the zero point of the output signal from the fiber-optic gyroscope which were obtained in the presence of the depolarizer 8. As shown in FIG. 4, the drift quantity of the zero point of the output signal from the fiber-optic gyroscope was equal to about 0.005 degree/second in the absence of the depolarizer 8.

The light source 1 may be composed of a semiconductor layer, a He-Ne laser, or others.

The optical fibers defining the optical paths 11, 12, 13, 14, 15, 16, 17, and 19 may be of the polarization-plane conservative type, or other types.

The optical fiber defining the sensing loop 6 is preferably of the single-mode type. The optical fiber defining the sensing loop 6 may be of the polarization-plane conservative type.

The first and second optical couplers 2 and 5 are preferably of the fiber-optic type. In this case, all the optical paths in the fiber-optic gyroscope can be formed by optical fibers. The optical fibers used in the first and second couplers 2 and 5 are of the single-mode type or the polarization-plane conservative type.

The polarizer 4 may be of the fiber-optic type. The polarizer 4 may also be of the type including an optical waveguide directly clad with metal. In addition, the polarizer 4 may be of the waveguide type including an optical waveguide substrate made of an anisotropic optical crystal such as $LiNbO_3$.

The depolarizer 8 may be located between the optical paths 18 and 19. The depolarizer 8 may also be located between the optical paths 17 and 18. In addition, the depolarizer 8 may be located in the major part of the sensing loop 6. The depolarizer 8 may be of the bulk Lyot type using a birefringent crystal. A depolarizer or depolarizers may be provided in addition to the depolarizer 8. The additional depolarizer or polarizers are located in suitable positions such as a position between the optical paths 18 and 19, a position between the optical paths 17 and 18, and a position in the sensing loop 6.

The phase modulator 7 may be of the waveguide type, or other types.

Second Embodiment

Figure 5:
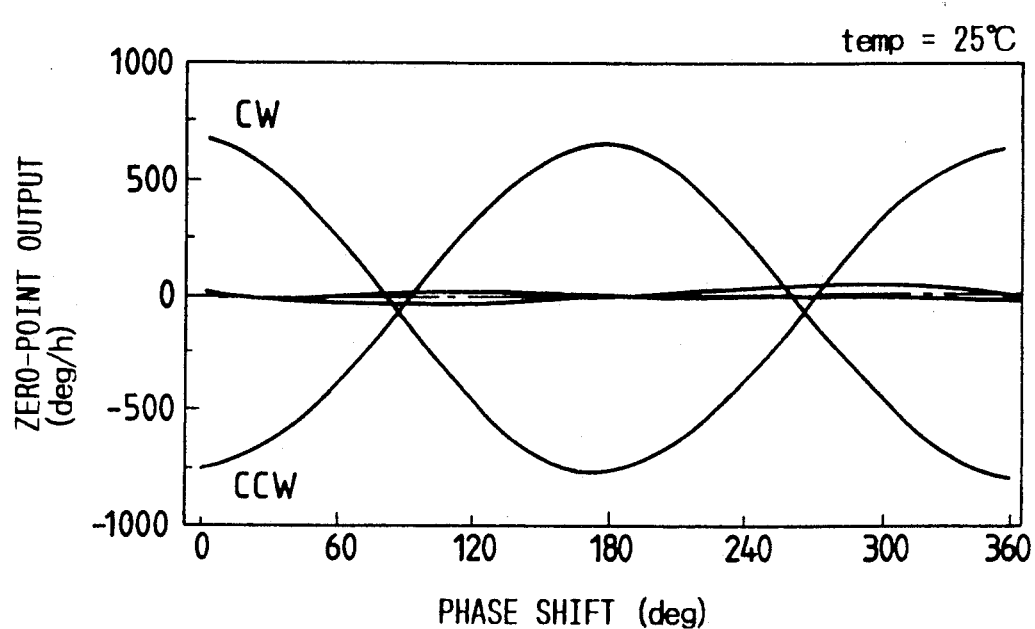
FIGS. 5–11 are diagrams showing the relation between a phase shift amount and a zero-point output level.

A second embodiment of this invention uses the results of experiments. During the experiments, the noise phase-responsive characteristics of the zero point of the output signal from the fiber-optic gyroscope of FIG. 2 were measured by using sync detection under conditions where the fiber-optic gyroscope remained stationary and the temperature of the fiber-optic gyroscope was 25° C. FIG. 5 shows the result of the measurement. In FIG. 5, the abscissa denotes the amount of a phase shift which was provided to a reference signal for the sync detection, and the ordinate denotes the level of the zero point of the output signal from the fiber-optic gyroscope, that is, the zero bias value of the output signal from the fiber-optic gyroscope, which is represented in unit of angular velocity (degree/hour). In FIG. 5, the amplitude in the direction of the ordinate virtually denotes a value of the zero-point drift, that is, a value of the noise component. This noise component agreed with an AM noise component, having a fixed characteristic with respect to a variation in the phase shift amount. Specifically, the variation amount of the output signal was minimized to zero for a given phase shift amount. Under conditions where the fiber-optic gyroscope was rotated in the clockwise (CW) direction at an angular velocity of 0.2 degree/second, the level of the output signal from the fiber-optic gyroscope, that is, the sensitivity of the fiber-optic gyroscope, was measured for varying phase shift amounts. The measured levels are plotted as the curve CW in FIG. 5. Under conditions where the fiber-optic gyroscope was rotated in the counterclockwise (CCW) direction at an angular velocity of 0.2 degree/second, the level of the output signal from the fiber-optic gyroscope, that is, the sensitivity of the fiber-optic gyroscope, was measured at varying phase shift amounts. The measured levels are plotted as the curve CCW in FIG. 5. As understood from the CW curve and the CCW curve of FIG. 5, the sensitivity of the fiber-optic gyroscope was maximized at phase shift amounts of 0 degree, 180 degrees, and 360 degrees. As understood from FIG. 5, the AM noise phase-responsive characteristics have nodes at phase shift amounts near the sensitivity-maximizing phase shift amounts. Accordingly, in cases where the phase shift amount is set so as to minimize the level of the AM noise, both a high sensitivity of the fiber-optic gyroscope and a good S/N ratio of the output signal from the fiber-optic gyroscope can be attained.

Figure 6:
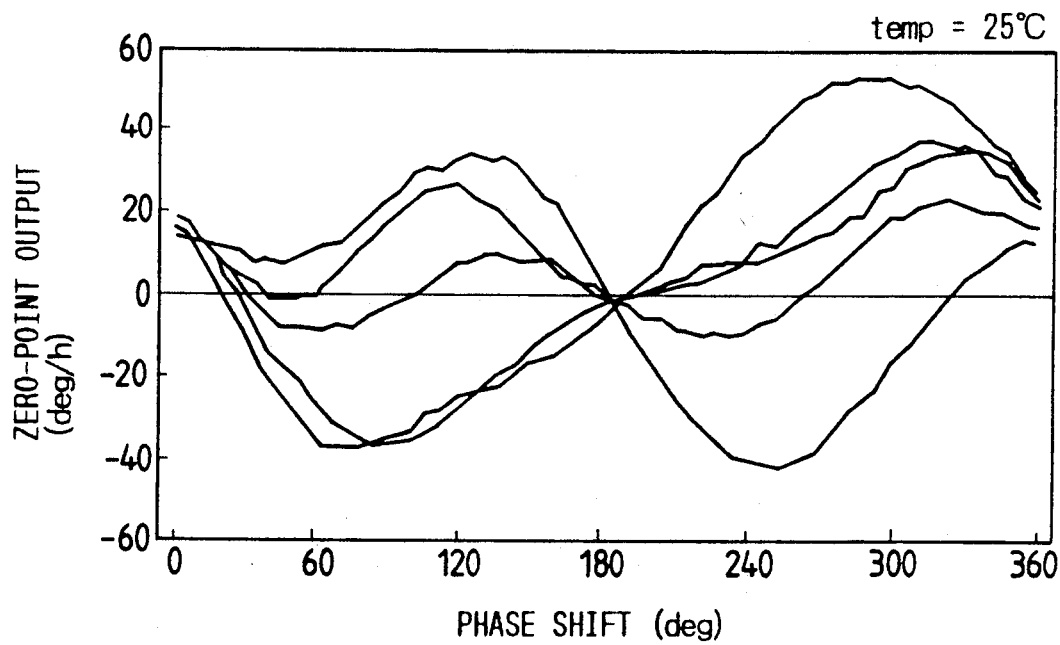
Figure 7:
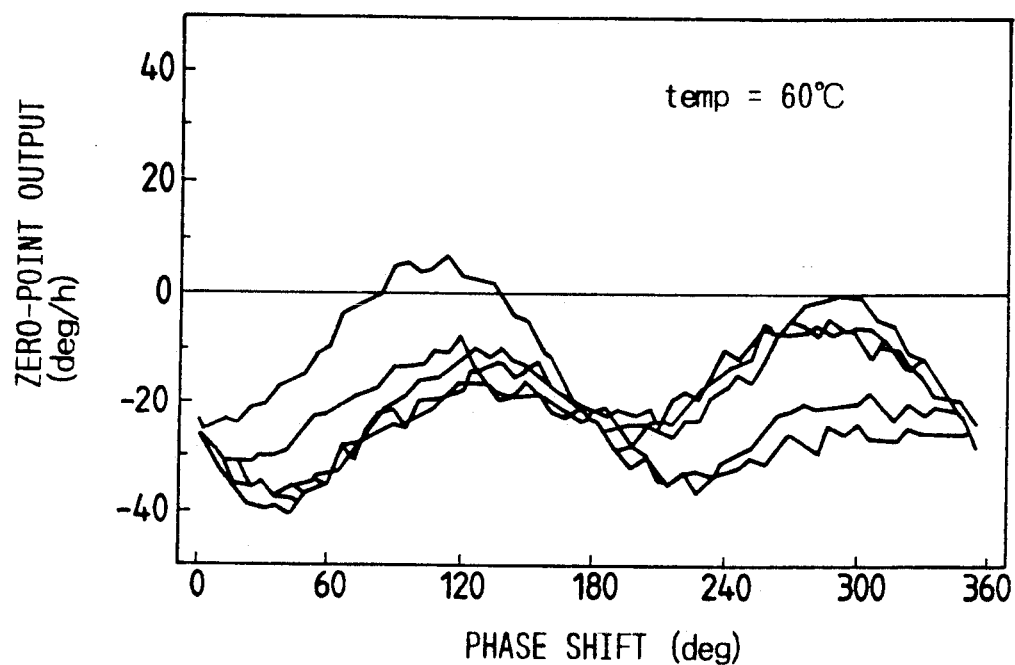
Figure 8:
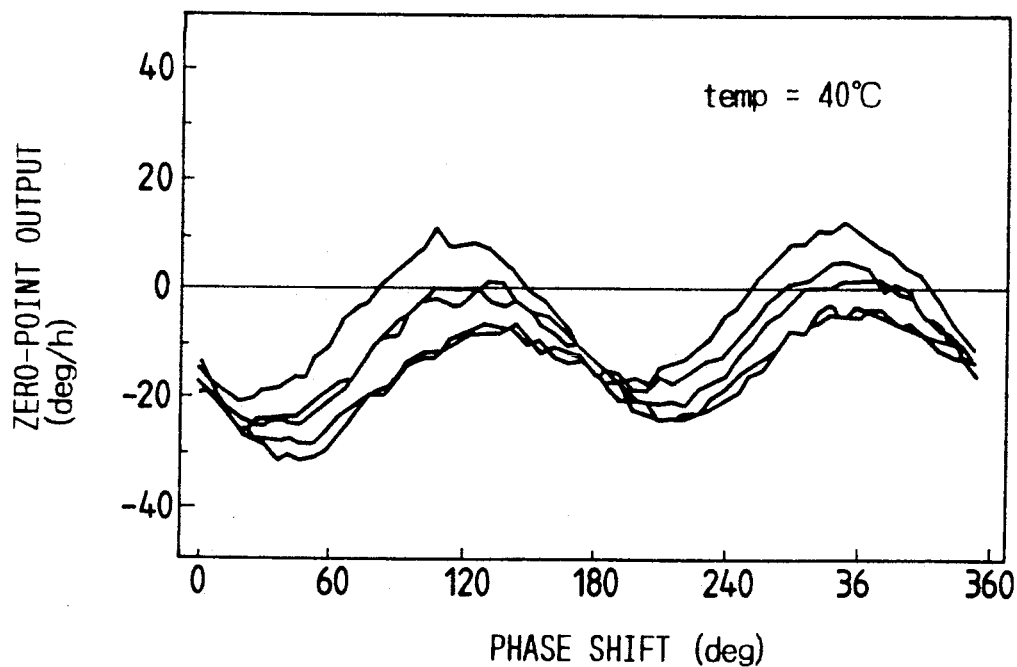
Figure 9:
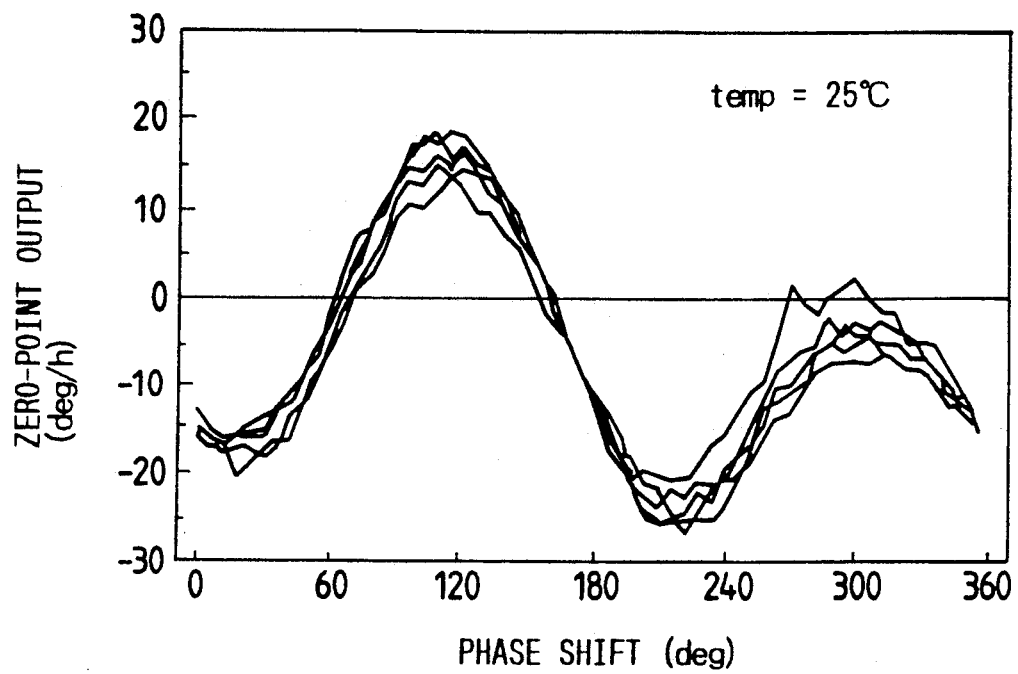
Figure 10:
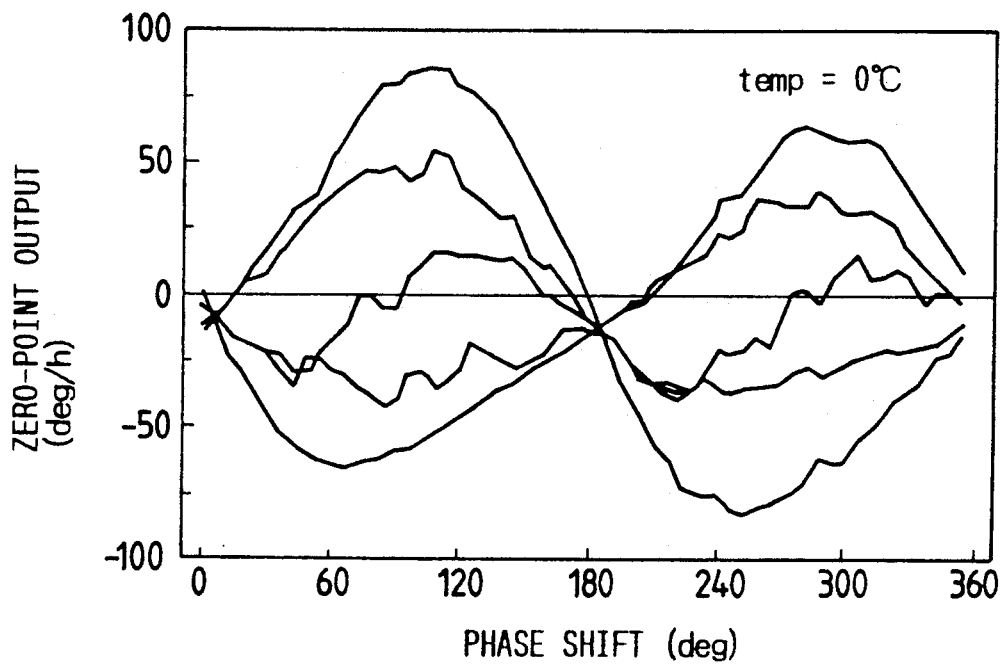
Figure 11:
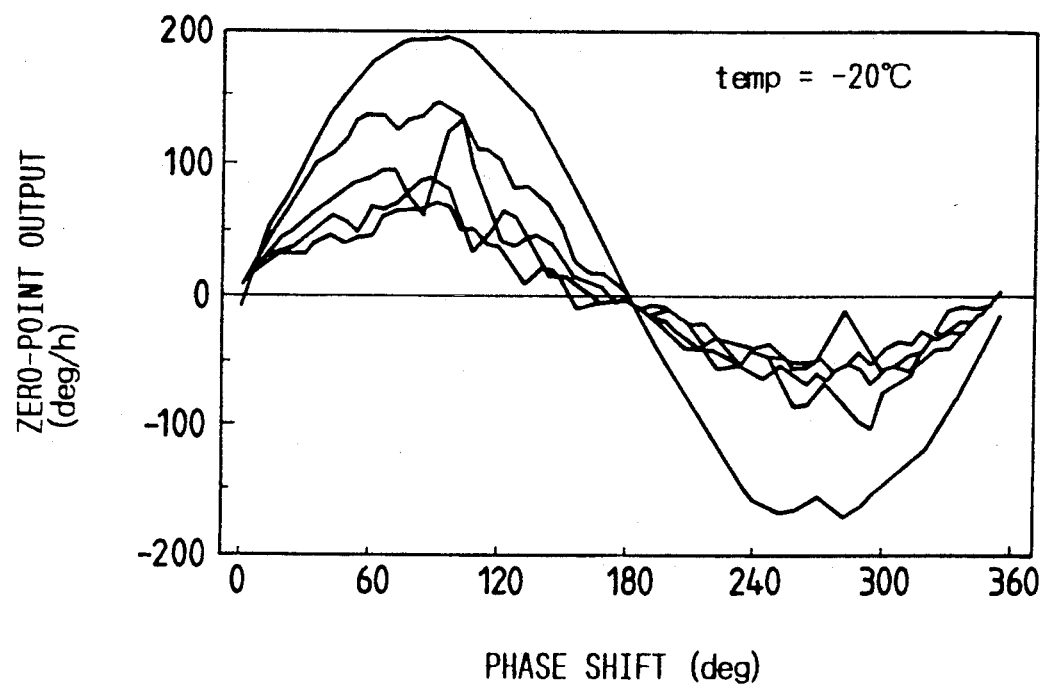

FIG. 6 shows the relation between the AM noise and the phase shift amount of the reference signal with enlarged scales of the level of the AM noise in the output signal from the fiber-optic gyroscope. As shown in FIG. 6, the AM noise had a node at a phase shift amount of about 180 degrees. As understood from FIGS. 5 and 6, there was an interval of about 90 degrees between the phase shift amount at which the rotation-dependent signal was minimized and the phase shift amount at which the level of the AM noise was minimized. It is thought that the AM noise is caused by the modulation of the intensity of the CW light and the CCW light which occurs simultaneously with the phase modulation of the CW light and the CCW light by the phase modulator 7. As shown in FIG. 6, although the amplitude of the AM noise components varied greatly, the node of the AM noise components was substantially fixed at a point corresponding to a phase shift amount of about 180 degrees.

The AM noise characteristics of the output signal from the fiber-optic gyroscope in response to the phase shift amount of the reference signal were measured also at temperatures of 60° C., 40° C., 25° C., 0° C., and −20° C. FIGS. 7, 8, 9, 10, and 11 show the results of the measurement at temperatures of 60° C., 40° C., 25° C., 0° C., and −20° C. respectively. As understood from FIGS. 6–11, the node of the AM noise components was substantially fixed, independent of the temperature of the fiber-optic gyroscope, at a point corresponding to a phase shift amount of about 180 degrees.

Figure 12:
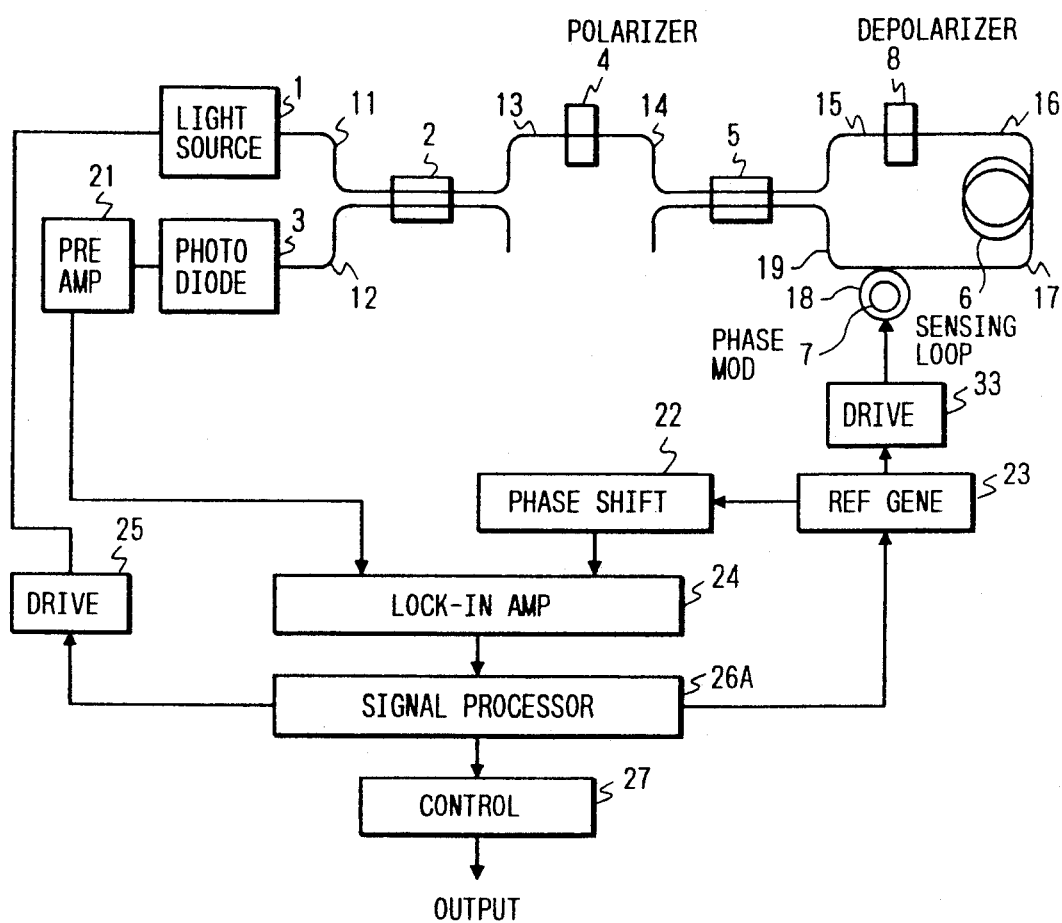
FIG. 12 is a diagram of a fiber-optic gyroscope according to a second embodiment of this invention.

FIG. 12 shows a second embodiment of this invention which is similar to the embodiment of FIG. 2 except for an additional arrangement explained later.

As shown in FIG. 12, the second embodiment includes a reference signal generator 23 which outputs a reference signal of a predetermined frequency to a drive circuit 33. The drive circuit 33 generates a phase modulating signal in correspondence with the reference signal, and feeds the phase modulating signal to the phase modulator 7. The phases of the CW and CCW light beams are modulated by the phase modulator 7 in accordance with the phase modulating signal. The reference signal generator 23 also outputs the reference signal to a variable phase shifter 22. The phase shifter 22 shifts the input reference signal by an adjustable amount, converting the input reference signal into a second reference signal. The output signal from the photodiode 3 is fed via a preamplifier 21 to a lock-in amplifier 24. The lock-in amplifier 24 receives the second reference signal from the phase shifter 22. The lock-in amplifier 24 subjects the photodiode output signal to a synchronous detection process by using the second reference signal. The output signal from the lock-in amplifier 24 is converted by a signal processor 26A into a signal directly representing the angular velocity of the fiber-optic gyroscope. The information of the angular velocity is transmitted from the signal processor 26A to an external device (not shown) via a signal controller 27. The signal processor 26 also generates a feedback signal on the basis of the output signal from the lock-in amplifier 24. The feedback signal is fed to a drive circuit 25. The drive circuit 25 drives the light source 1 in response to the feedback signal. The drive of the light source 1 in response to the feedback signal is designed so that the intensity of the light emitted from the light source 1 can be held essentially constant.

Furthermore, the signal processor 26A generates a feedback signal on the basis of the output signal from the lock-in amplifier 24. The feedback signal is fed to the reference signal generator 23 so that the level of the output from the reference signal generator 23, that is, the degree of the phase modulation, can be held essentially constant.

In view of the fact that the level of the AM noise components is minimized at a given amount of the phase shift of the reference signal as shown in FIGS. 5 and 6, the amount of the reference-signal phase shift by the phase shifter 22 is set to an amount at which the level of the AM noise in the rotation-representing signal in the signal processor 26A can be minimized. The phase of the second reference signal fed to the lock-in amplifier 24 can be held at the noise-minimizing phase by the application of the feedback signal from the signal processor 26A to the reference signal generator 23. Thus, the output signal from the signal processor 26A can be highly accurate and can be drift-free.

Figure 13:
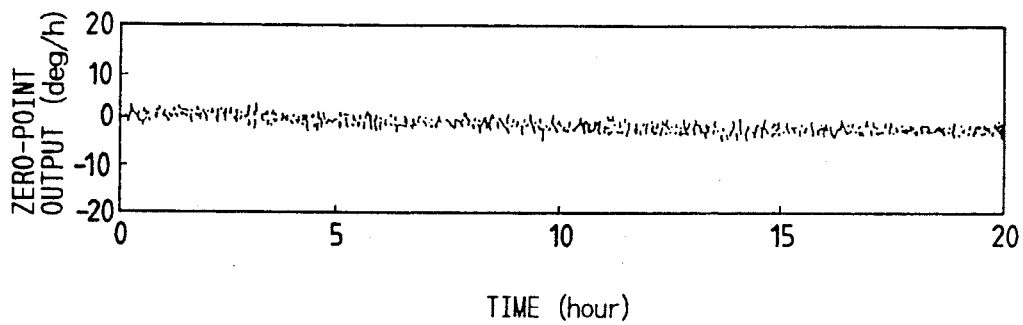
FIG. 13 is a diagram showing time-domain variations of a zero-point output level in the fiber-optic gyroscope of FIG. 12.

Experiments were performed on the zero-point drift characteristics of the output signal from the fiber-optic gyroscope of this embodiment. During the experiments, the zero-point level of the output signal from the fiber-optic gyroscope was measured for a long time. FIG. 13 shows the results of the measurement. As shown in FIG. 13, the zero-point level of the output signal from the fiber-optic gyroscope remained substantially constant for a long time such as more than 100 hours.

The results of the measurement of the phase-responsive noise characteristics which are obtained in a temperature range from −20° C. to 60° C. may be previously fed to the signal processor 26 so that good zero-point drift characteristics of the rotation-representing output signal can be attained for a wide temperature range.

The phase of the reference signal may be controlled so that the sensitivity of the fiber-optic gyroscope can be maximized.

Third Embodiment

Figure 14:
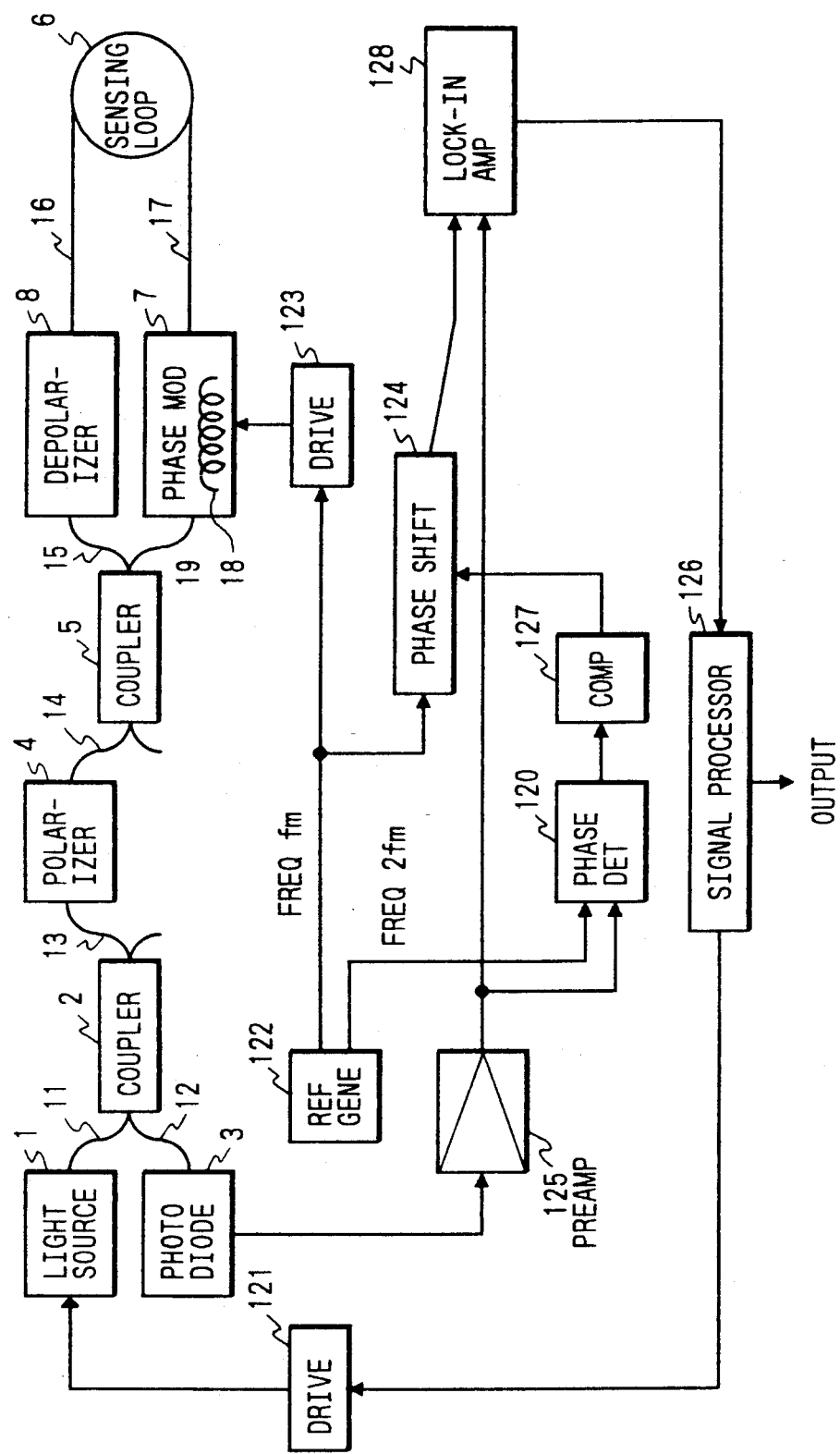
FIG. 14 is a diagram of a fiber-optic gyroscope according to a third embodiment of this invention.

FIG. 14 shows a third embodiment of this invention which is similar to the embodiment of FIG. 12 except for design changes indicated hereinafter.

As shown in FIG. 14, the third embodiment includes a reference signal generator 122 which outputs a first reference signal of a predetermined frequency fm to a drive circuit 123. The drive circuit 123 generates a phase modulating signal in correspondence with the first reference signal, and feeds the phase modulating signal to a phase modulator 7. The phases of the CW and CCW light beams are modulated by the phase modulator 7 in accordance with the phase modulating signal. Thus, the CW and CCW light beams are phase-modulated at a frequency equal to the frequency fm of the first reference signal. The reference signal generator 122 also outputs the first reference signal to a variable phase shifter 124. The phase shifter 124 shifts the first reference signal by an adjustable amount, converting the first reference signal into a second reference signal. The output signal from the photodiode 3 is fed via a preamplifier 125 to a lock-in amplifier 128. The lock-in amplifier 128 receives the second reference signal from the phase shifter 124. The lock-in amplifier 128 subjects the photodiode output signal to a synchronous detection process by using the second reference signal. The output signal from the lock-in amplifier 128 is converted by a signal processor 126 into a signal directly representing the angular velocity of the fiber-optic gyroscope. The signal processor 126 also generates a feedback signal on the basis of the output signal from the lock-in amplifier 128. The feedback signal is fed to a drive circuit 121. The drive circuit 121 drives the light source 1 in response to the feedback signal. The drive of the light source 1 in response to the feedback signal is designed so that the intensity of the light emitted from the light source 1 can be held essentially constant.

Furthermore, the reference signal generator 122 outputs a third reference signal of a predetermined frequency 2 fm to a phase detector 120. The frequency 2 fm of the third reference signal is twice the frequency fm of the first reference signal. The output signal from the photodiode 3 is transmitted via the preamplifier 125 to the phase detector 120. The phase detector 120 subjects the photodiode output signal to a phase detection process by using the third reference signal, and detects the phase of the components of the photodiode output signal which have a frequency twice the frequency fm of the first reference signal. In other words, the phase detector 120 detects the phase of a second-harmonic component of the photodiode output signal. A compensation circuit 127 following the phase detector 120 generates a control signal on the basis of the output signal from the phase detector 120, and outputs the control signal to the phase shifter 124. The amount of the phase shift of the first reference signal by the phase shifter 124 is controlled in response to the control signal fed from the compensation circuit 127. The compensation circuit 127 compensates for the gain and the response time so that the amount of the phase shift by the phase shifter 124 can be equal to a predetermined fraction, for example, a half, of the phase detected by the phase detector 120.

As understood from the previous description, the phase of the second reference signal fed to the lock-in amplifier 128 is controlled by the phase shifter 124. The control of the phase of the second reference signal is designed so that the phase of the second reference signal can remain in a predetermined relation with the phase of the components of the photodiode output signal which have the given frequency fm, and that the lock-in amplifier 128 can execute the sync detection with the given phase of the second reference signal at which the level of the AM noise is minimized.

The phase detector 120 and the reference signal generator 122 may be designed so that a phase detection will be given of the components of the photodiode output signal which have a frequency equal to four times the frequency fm of the first reference signal.

The phase shifter 124 may be moved to a position between the preamplifier 125 and the lock-in amplifier 128.

Fourth Embodiment

Figure 15:
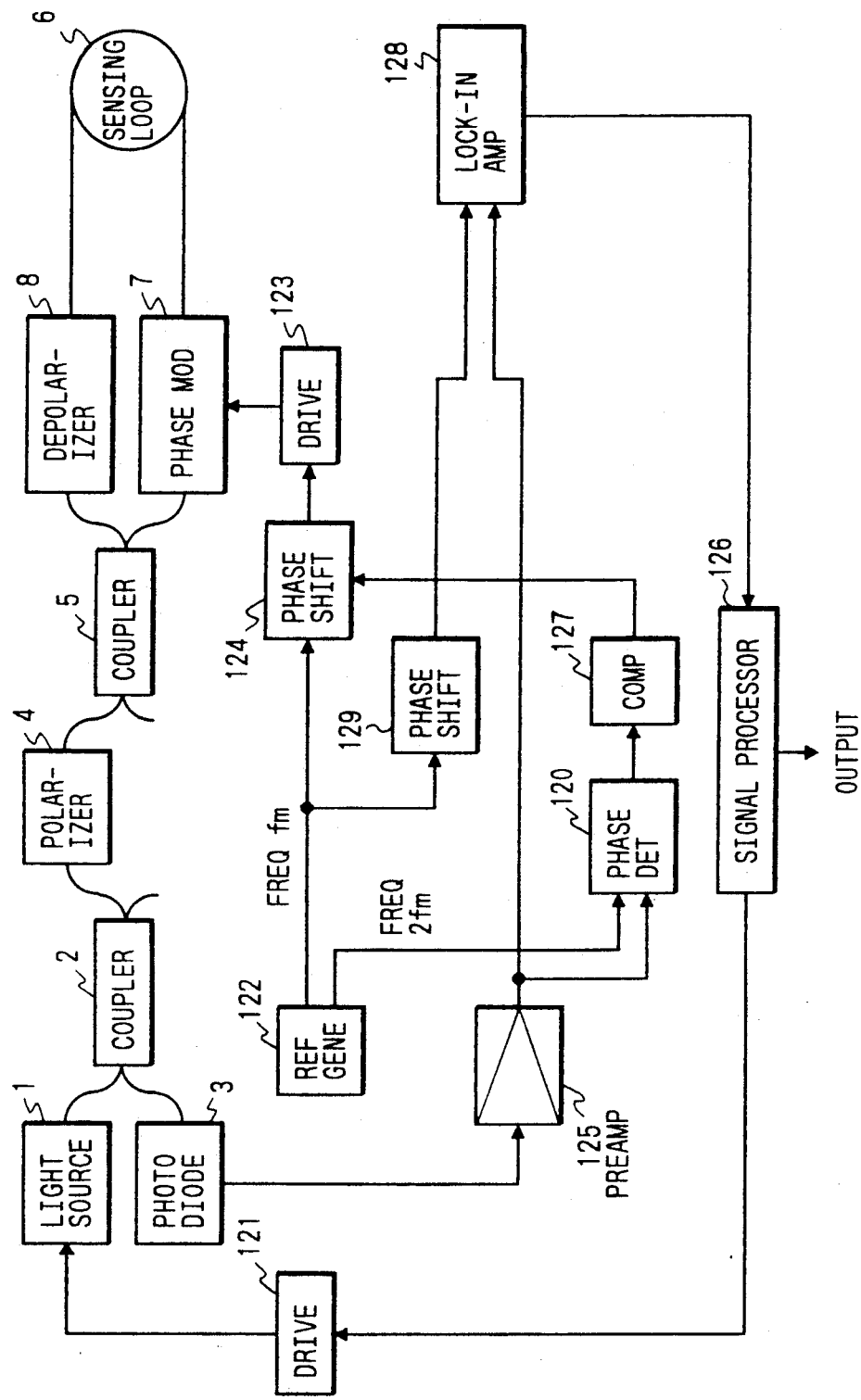
FIG. 15 is a diagram of a fiber-optic gyroscope according to a fourth embodiment of this invention.

FIG. 15 shows a fourth embodiment of this invention which is similar to the embodiment of FIG. 14 except for design changes indicated hereinafter.

As shown in FIG. 15, the fourth embodiment includes a reference signal generator 122 which outputs a first reference signal of a predetermined frequency fm to a variable phase shifter 124. The phase shifter 124 shifts the first reference signal by an adjustable amount, converting the first reference signal into a second reference signal. The phase shifter 124 outputs the second reference signal to a drive circuit 123. The drive circuit 123 generates a phase modulating signal in correspondence with the second reference signal, and feeds the phase modulating signal to the phase modulator 7. The phases of the CW and CCW light beams are modulated by the phase modulator 7 in accordance with the phase modulating signal. Thus, the CW and CCW light beams are phase-modulated at a frequency equal to the frequency fm of the first reference signal. The reference signal generator 122 also outputs the first reference signal to a fixed phase shifter 129. The phase shifter 129 shifts the first reference signal by a predetermined amount, converting the first reference signal into a third reference signal. The output signal from the photodiode 3 is fed via a preamplifier 125 to a lock-in amplifier 128. The lock-in amplifier 128 receives the third reference signal from the phase shifter 129. The lock-in amplifier 128 subjects the photodiode output signal to a synchronous detection process by using the third reference signal. The output signal from the lock-in amplifier 128 is converted by a signal processor 126 into a signal directly representing the angular velocity of the fiber-optic gyroscope. The signal processor 126 also generates a feedback signal on the basis of the output signal from the lock-in amplifier 128. The feedback signal is fed to a drive circuit 121. The drive circuit 121 drives the light source 1 in response to the feedback signal. The drive of the light source 1 in response to the feedback signal is designed so that the intensity of the light emitted from the light source 1 can be held essentially constant.

Furthermore, the reference signal generator 122 outputs a fourth reference signal of a predetermined frequency 2fm to a phase detector 120. The frequency 2fm of the fourth reference signal is twice the frequency fm of the first reference signal. The output signal from the photodiode 3 is transmitted via the preamplifier 125 to the phase detector 120. The phase detector 120 subjects the photodiode output signal to a phase detection process by using the fourth reference signal, and detects the phase of the components of the photodiode output signal which have a frequency twice the frequency fm of the first reference signal. In other words, the phase detector 120 detects the phase of a second-harmonic component of the photodiode output signal. A compensation circuit 127 following the phase detector 120 generates a control signal on the basis of the output signal from the phase detector 120, and outputs the control signal to the phase shifter 124. The amount of the phase shift of the first reference signal by the phase shifter 124 is controlled in response to the control signal fed from the compensation circuit 127. The compensation circuit 127 compensates for the gain and the response time so that the amount of the phase shift by the phase shifter 124 can be equal to a predetermined fraction, for example, a half, of the phase detected by the phase detector 120.

As understood from the previous description, the phase of the second reference signal fed to the phase modulation drive circuit 123 is controlled by the phase shifter 124. Thus, the phase of the components of the photodiode output signal which have a frequency equal to the frequency fm of the first reference signal is controlled by the phase shifter 124 relative to the phase of the third reference signal fed to the lock-in amplifier 128. This phase control is designed so that the phase of the third reference signal can remain in a predetermined relation with the phase of the components of the photodiode output signal which have the given frequency fm, and that the lock-in amplifier 128 can execute the sync detection with the given phase of the third reference signal at which the level of the AM noise is minimized.

Fifth Embodiment

Figure 16:
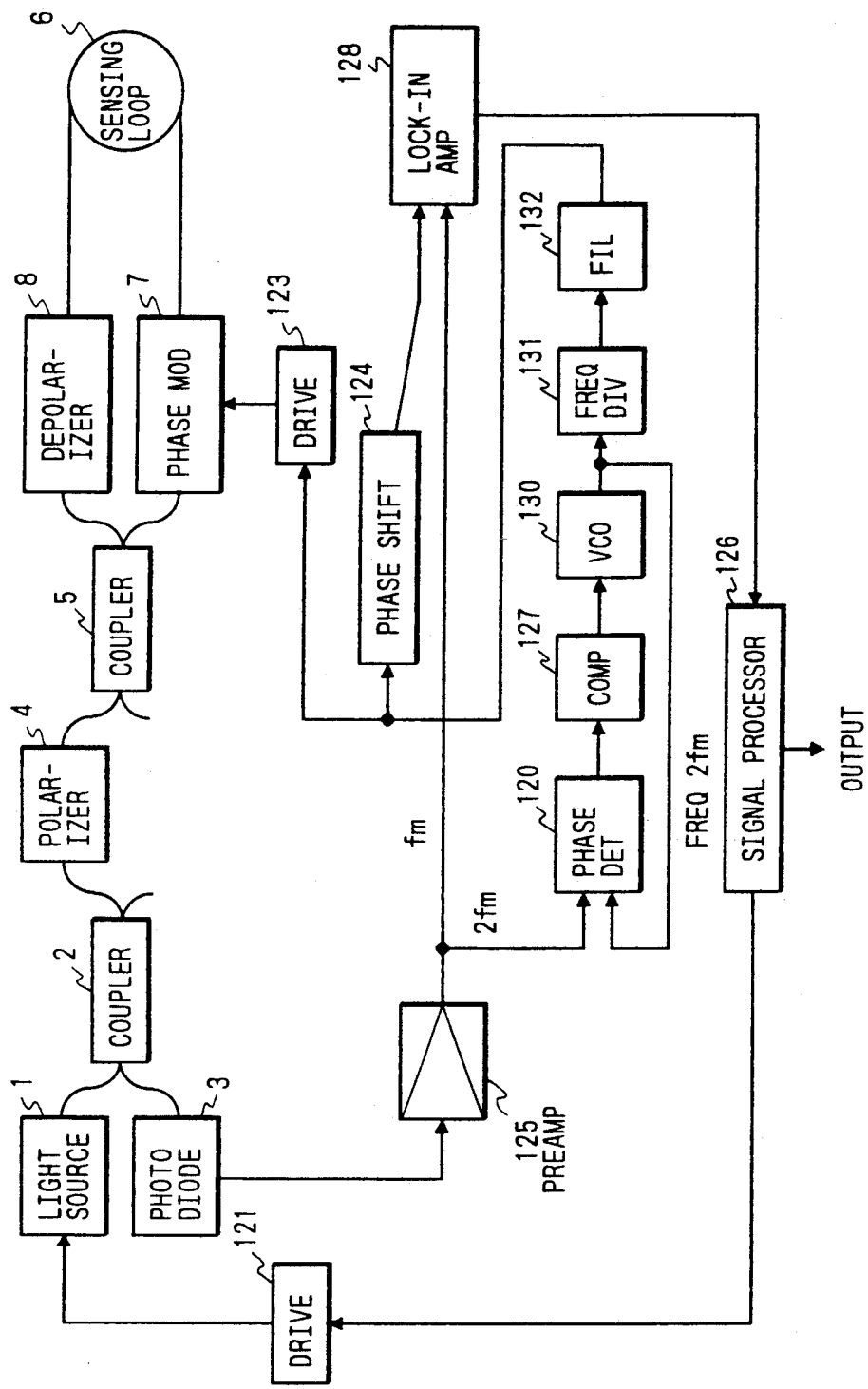
FIG. 16 is a diagram of a fiber-optic gyroscope according to a fifth embodiment of this invention.

FIG. 16 shows a fifth embodiment of this invention which is similar to the embodiment of FIG. 15 except for design changes indicated hereinafter.

As shown in FIG. 16, the fifth embodiment includes a phase detector 120 which receives the output signal from a photodiode 3 via a preamplifier 125. The components of the photodiode output signal which have a frequency 2fm twice a given frequency fm are subjected to a phase detection process by the phase detector 120 in response to an output signal from a voltage-controlled oscillator (VCO) 130. The output signal from the phase detector 120 is processed by a compensation circuit 127. The compensation circuit 127 compensates for the gain and the response time. The output signal from the compensation circuit 127 is fed to the VCO 130 as a control signal. The output signal from the VCO 130 is fed back to the phase detector 120. The loop formed by the phase detector 120, the compensation circuit 127, and the VCO 130 generates a signal which is locked in frequency and phase to the 2fm-frequency components of the photodiode output signal. This generated signal is outputted from the loop to a frequency divider 131. The frequency divider 131 halves the frequency of the received signal, converting the received signal into a reference signal of the given frequency fm. The reference signal is transmitted from the frequency divider 131 to a drive circuit 123 and a fixed phase shifter 129 via a filter 132. The filter 132 removes signal components having frequencies different from the given frequency fm.

The drive circuit 123 generates a phase modulating signal in correspondence with the reference signal, and feeds the phase modulating signal to the phase modulator 7. The phases of the CW and CCW light beams are modulated by the phase modulator 7 in accordance with the phase modulating signal. Thus, the CW and CCW light beams are phase-modulated at a frequency equal to the frequency fm of the first reference signal. The phase shifter 129 shifts the first reference signal by a predetermined amount, converting the first reference signal into a second reference signal. The output signal from the photodiode 3 is fed via the preamplifier 125 to a lock-in amplifier 128. The lock-in amplifier 128 receives the second reference signal from the phase shifter 129. The lock-in amplifier 128 subjects the photodiode output signal to a synchronous detection process by using the second reference signal. The output signal from the lock-in amplifier 128 is converted by a signal processor 126 into a signal directly representing the angular velocity of the fiber-optic gyroscope. The signal processor 126 also generates a feedback signal on the basis of the output signal from the lock-in amplifier 128. The feedback signal is fed to a drive circuit 121. The drive circuit 121 drives the light source 1 in response to the feedback signal. The drive of the light source 1 in response to the feedback signal is designed so that the intensity of the light emitted from the light source 1 can be held essentially constant.

The phase shifter 129 provides a predetermined phase difference between the second reference signal and the photodiode output signal fed to the lock-in amplifier 128. This provision of the phase difference is designed so that the phase of the second reference signal can remain in a predetermined relation with the phase of the components of the photodiode output signal which have the given frequency fm, and that the lock-in amplifier 128 can execute the sync detection with the given phase of the second reference signal at which the level of the AM noise is minimized.

Sixth Embodiment

Figure 17:
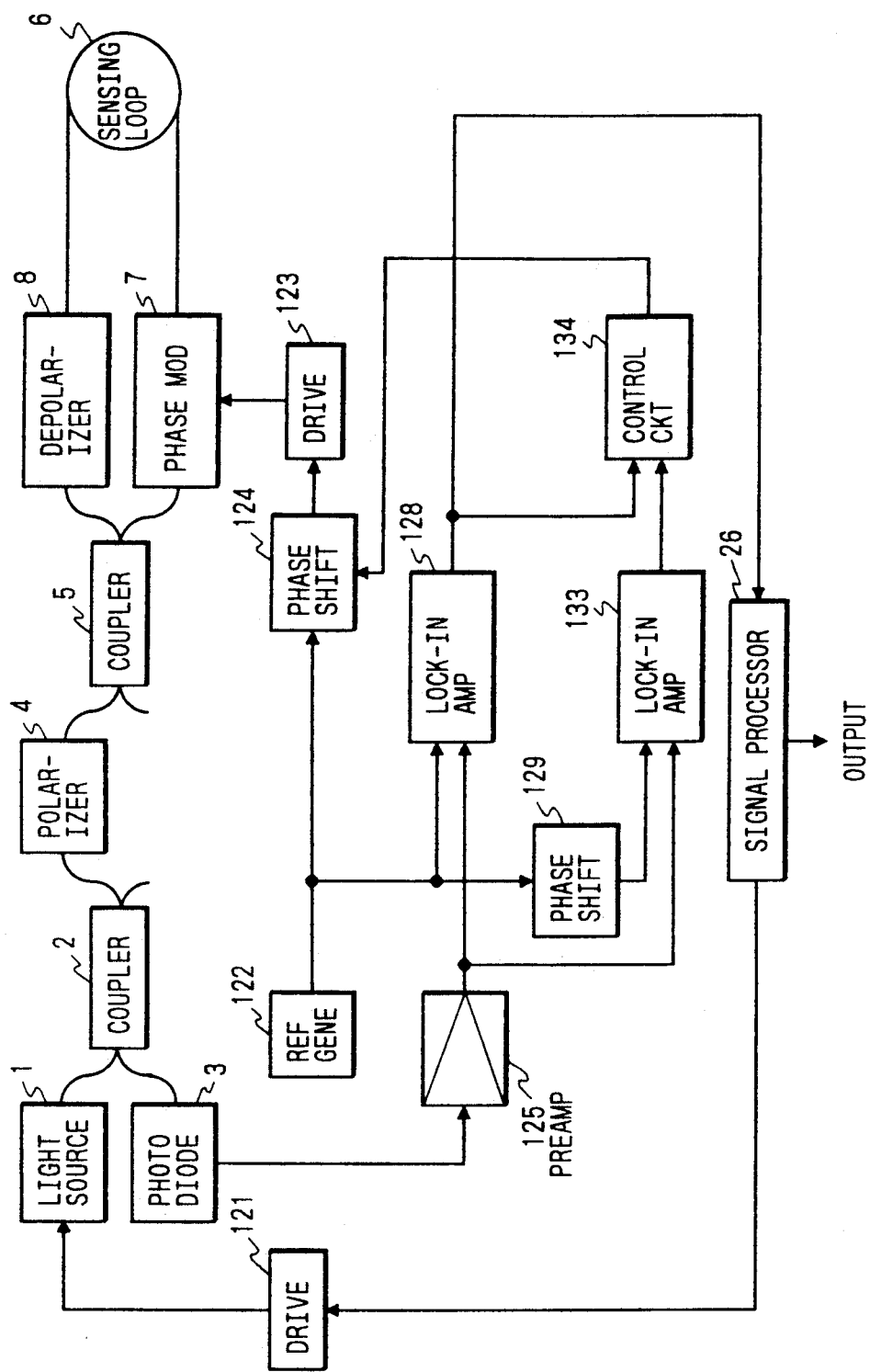
FIG. 17 is a diagram of a fiber-optic gyroscope according to a sixth embodiment of this invention.

FIG. 17 shows a sixth embodiment of this invention which is similar to the embodiment of FIG. 15 except for design changes indicated hereinafter.

As shown in FIG. 17, the sixth embodiment includes a reference signal generator 122 which outputs a first reference signal of a predetermined frequency fm to a variable phase shifter 124. The phase shifter 124 shifts the first reference signal by an adjustable amount, converting the first reference signal into a second reference signal. The phase shifter 124 outputs the second reference signal to a drive circuit 123. The drive circuit 123 generates a phase modulating signal in correspondence with the second reference signal, and feeds the phase modulating signal to the phase modulator 7. The phases of the CW and CCW light beams are modulated by the phase modulator 7 in accordance with the phase modulating signal. Thus, the CW and CCW light beams are phase-modulated at a frequency equal to the frequency fm of the first reference signal.

The reference signal generator 122 also outputs the first reference signal to a lock-in amplifier 128. The output signal from the photodiode 3 is fed via a preamplifier 125 to the lock-in amplifier 128. The lock-in amplifier 128 subjects the photodiode output signal to a synchronous detection process by using the first reference signal. The output signal from the lock-in amplifier 128 is converted by a signal processor 126 into a signal directly representing the angular velocity of the fiber-optic gyroscope. The signal processor 126 also generates a feedback signal on the basis of the output signal from the lock-in amplifier 128. The feedback signal is fed to a drive circuit 121. The drive circuit 121 drives the light source 1 in response to the feedback signal. The drive of the light source 1 in response to the feedback signal is designed so that the intensity of the light emitted from the light source 1 can be held essentially constant.

In addition, the reference signal generator 122 also outputs the first reference signal to a fixed phase shifter 129. The phase shifter 129 shifts the first reference signal by a predetermined amount, converting the first reference signal into a third reference signal. The phase shifter 129 outputs the third reference signal to a lock-in amplifier 133. The output signal from the photodiode 3 is fed via the preamplifier 125 to the lock-in amplifier 133. The lock-in amplifier 133 subjects the photodiode output signal to a synchronous detection process by using the third reference signal. The output signal from the lock-in amplifier 133 is fed to a control circuit 134. In addition, the output signal from the lock-in amplifier 128 is fed to the control circuit 134. The control circuit 134 generates a control signal on the basis of the output signals from the lock-in amplifiers 128 and 133, and outputs the control signal to the phase shifter 124. The amount of the phase shift of the first reference signal by the phase shifter 124 is controlled in response to the control signal fed from the control circuit 134.

The phase shifter 129 provides a predetermined phase difference between the first reference signal and the third reference signal fed to the lock-in amplifiers 128 and 133. The predetermined phase shift by the phase shifter 129 and the control of the phase shift of the first reference signal by the phase shifter 124 are designed so that the output signal from the lock-in amplifier 134 which corresponds to a rotation of the fiber-optic gyroscope will remain nullified, and that the lock-in amplifier 128 can execute the sync detection with a given phase of the first reference signal at which the level of the AM noise is minimized.

Figure 24:
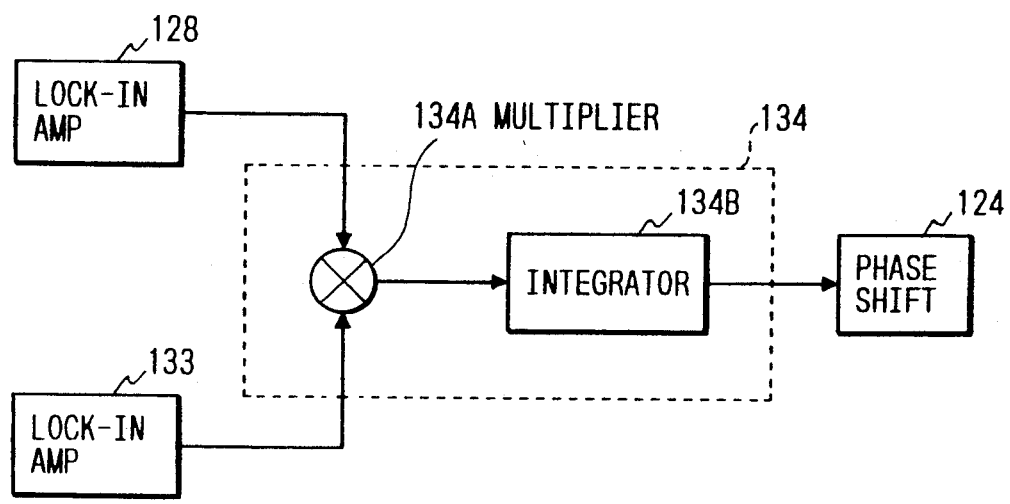
FIG. 24 is a block diagram of the control circuit of FIG. 17.

As shown in FIG. 24, the control circuit 134 includes a multiplier 134A and an integrator 134B. The multiplier 134A multiplies the output signals from the lock-in amplifiers 128 and 133. The integrator 134B integrates the output signal from the multiplier 134A into the control signal fed to the phase shifter 124. The control circuit 134 detects a correlation between the output signals from the lock-in amplifiers 128 and 133, and generates the control signal which represents the detected correlation.

The phase control of the reference signal by the phase shifters 124 and 129 may be designed so that the output signals from the lock-in amplifiers 128 and 133 will have opposite polarities but equal absolute values.

The phase shifter 124 may be moved to a position between the preamplifier 125 and the lock-in amplifier 128, a position between the preamplifier 125 and the lock-in amplifier 133, a position between the reference signal generator 122 and the lock-in amplifier 128, or a position between the reference signal generator 122 and the lock-in amplifier 133.

Seventh Embodiment

Figure 18:
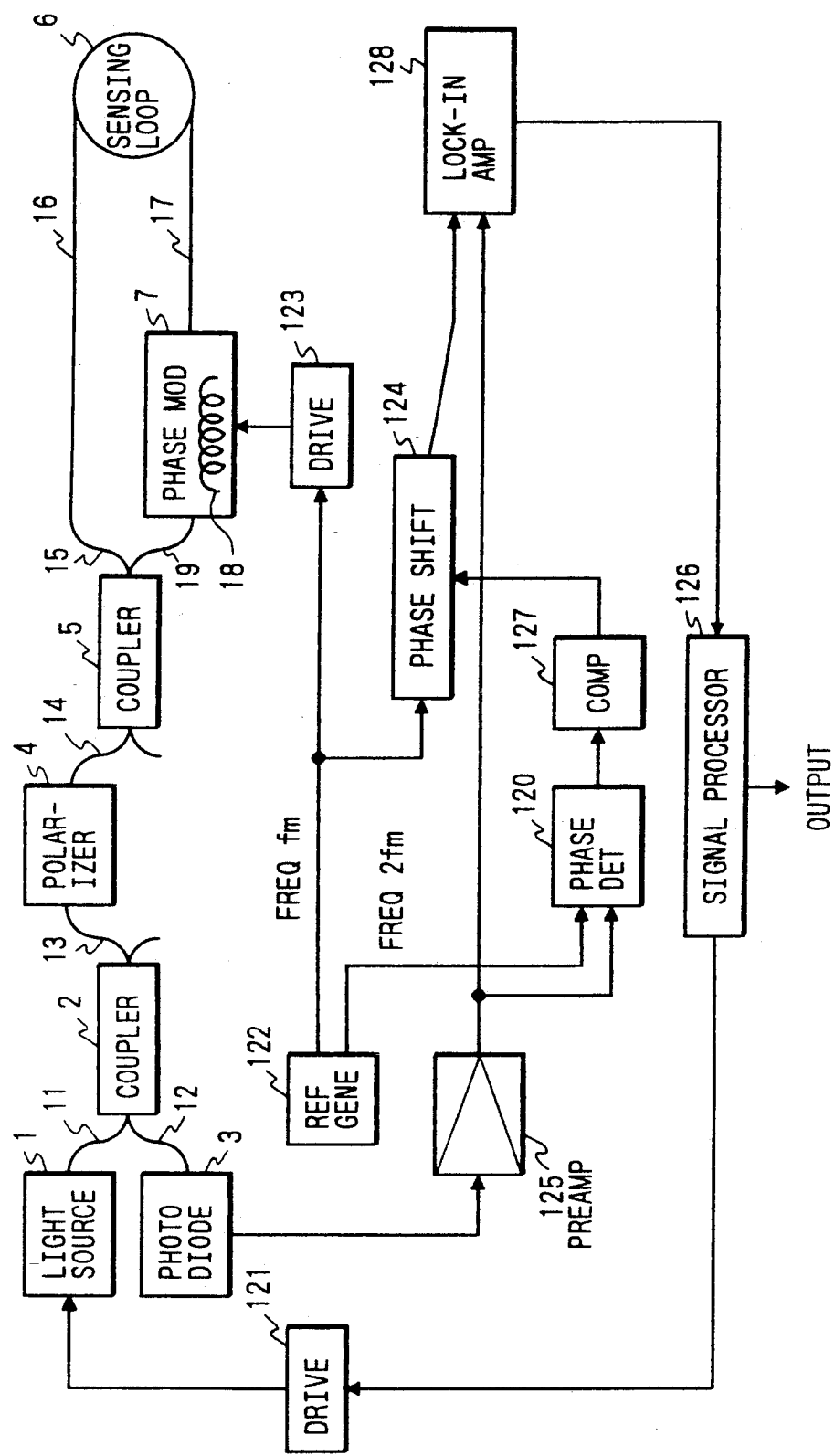
FIG. 18 is a diagram of a fiber-optic gyroscope according to a seventh embodiment of this invention.

FIG. 18 shows a seventh embodiment of this invention which is similar to the embodiment of FIG. 14 except that the depolarizer 8 (see FIG. 14) is removed.

Eighth Embodiment

Figure 19:
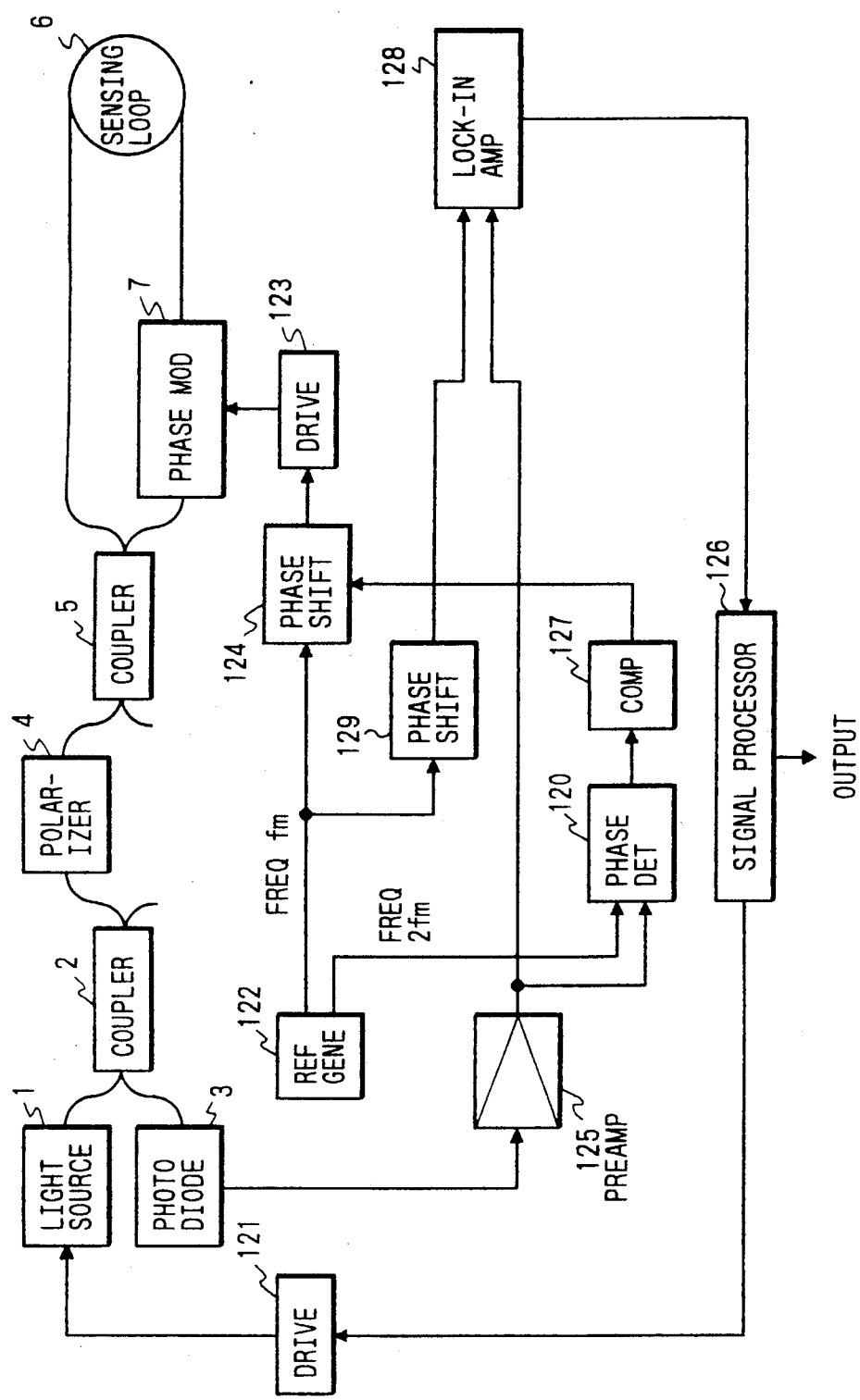
FIG. 19 is a diagram of a fiber-optic gyroscope according to an eighth embodiment of this invention.

FIG. 19 shows an eighth embodiment of this invention which is similar to the embodiment of FIG. 15 except that the depolarizer 8 (see FIG. 15) is removed.

Ninth Embodiment

Figure 20:
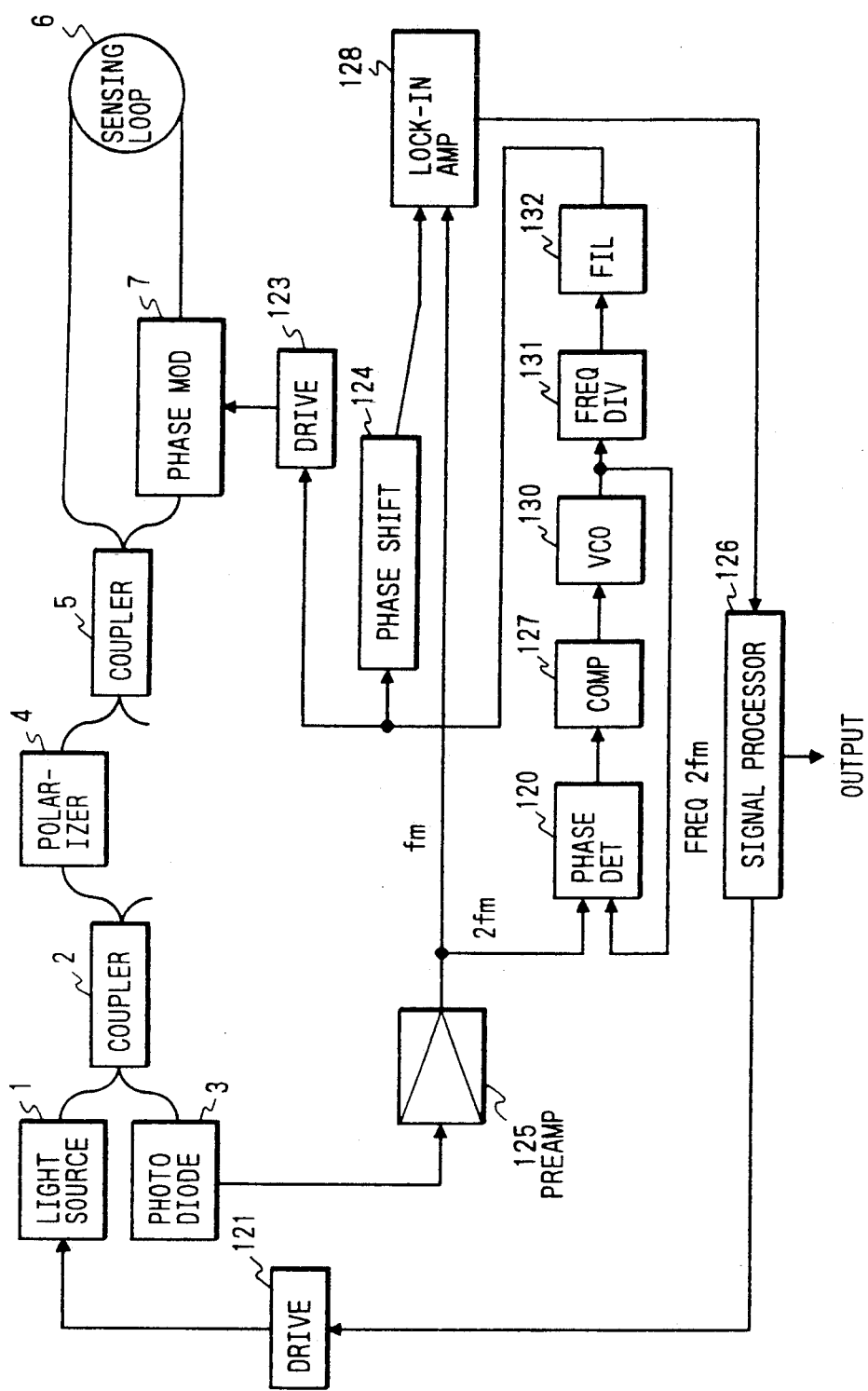
FIG. 20 is a diagram of a fiber-optic gyroscope according to a ninth embodiment of this invention.

FIG. 20 shows a ninth embodiment of this invention which is similar to the embodiment of FIG. 16 except that the depolarizer 8 (see FIG. 16) is removed.

Tenth Embodiment

Figure 21:
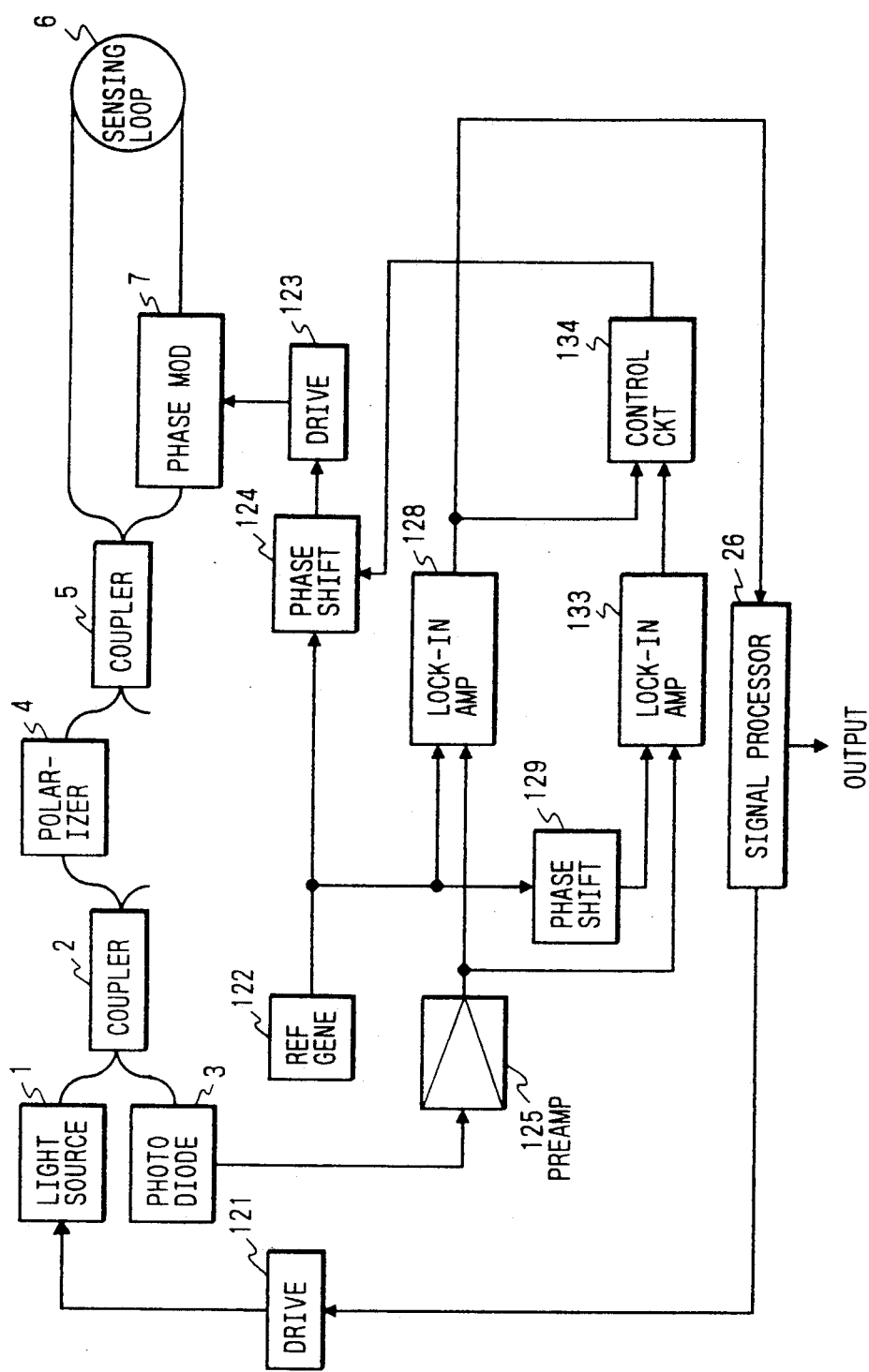
FIG. 21 is a diagram of a fiber-optic gyroscope according to a tenth embodiment of this invention.

FIG. 21 shows a tenth embodiment of this invention which is similar to the embodiment of FIG. 17 except that the depolarizer 8 (see FIG. 17) is removed.

Eleventh Embodiment

Figure 22:
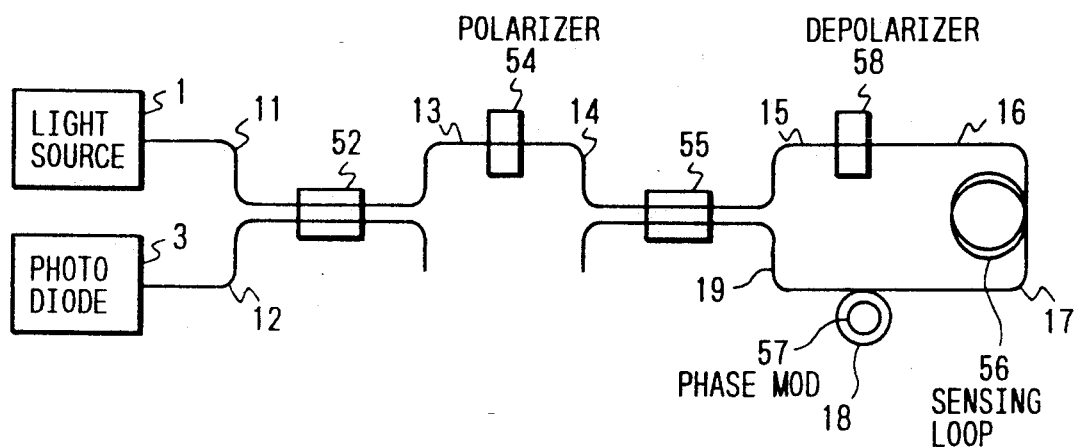
FIG. 22 is a diagram of a fiber-optic gyroscope according to an eleventh embodiment of this invention.

With reference to FIG. 22, a fiber-optic gyroscope includes a light source 1 using a super luminescence diode (an SLD). Light emitted from the light source 1 is guided to a first optical coupler 52 along an optical path 11 defined by an optical fiber. The first coupler 52 serves as a beam splitter. The first coupler 52 is of the fiber-optic type, using single-mode optical fibers. The light is separated by the first coupler 52 into two light beams having equal intensities. One of the light beams travels from the first coupler 52 to a laminated-type polarizer 54 via an optical path 13 defined by an optical fiber. The polarizer 54 confines the direction of the polarization of the light, and outputs light polarized in one direction. After passing through the polarizer 54, the light travels to a second optical coupler 55 via an optical path 14 defined by an optical fiber. The second coupler 55 serves as a beam splitter. The second coupler 55 is of the fiber-optic type, using single-mode optical fibers.

The light is separated by the beam splitter 55 into two beams, which travel to a depolarizer 58 and a phase modulator 57 via optical paths 15 and 19 defined by optical fibers respectively. The depolarizer 58 serves to convert the polarized light into natural light. After passing through the depolarizer 58, the light beam enters a sensing loop 56 via an optical path 16 and then propagates through the sensing loop 56 in the clockwise (CW) direction. The light traveling through the sensing loop 56 in the CW direction will be referred to as the CW light hereinafter. The optical path 16 and the sensing loop 6 are defined by optical fibers. The CW light exits from the sensing loop 56, and then travels to the phase modulator 57 via an optical path 17 defined by an optical fiber. The CW light propagates through an optical path 18 defined by an optical fiber wound around a piezoelectric element of the phase modulator 57. After exiting from the phase modulator 57, the CW light travels to the second coupler 55 via the optical path 19.

The other light beam passes through the optical path 18 within the phase modulator 57, and then travels to the sensing loop 56 via the optical path 17. The light beam enters the sensing loop 56 and propagates through the sensing loop 56 in the counterclockwise (CCW) direction. The light traveling through the sensing loop 56 in the CCW direction will be referred to as the CCW light. The CCW light exits from the sensing loop 56, and then travels to the depolarizer 58 via the optical path 16. The depolarizer 58 converts the polarized light into natural light. After passing through the depolarizer 58, the CCW light travels to the second coupler 55 via the optical path 15.

The CW light and the CCW light are combined by the second coupler 55 into a single return light beam while interfering with each other. After exiting from the second coupler 55, the return light propagates to the first coupler 52 via the optical path 14, the polarizer 54, and the optical path 13. The return light is separated by the first coupler 52 into two light beams, one of which travels from the first coupler 52 to a photodiode 3 via an optical path 12 defined by an optical fiber. The light beam is converted by the photodiode 3 into a corresponding electric signal.

The polarizer 54 is provided for the reason as follows. Generally, two modes of light waves which have orthogonal polarization directions can propagate in an optical fiber. The nonaxisymmetric characteristics of the optical fiber causes an energy coupling between the two orthogonal modes. If the energy coupling conditions change due to a temperature variation or other factors, an error is induced in the output signal from the fiber-optic gyroscope. Specifically, the error causes an drift in the output signal from the fiber-optic gyroscope. A good way of reducing such a drift in the output signal from the fiber-optic gyroscope is to equalize the transfer functions for the CW light and the CCW light. This is realized by the provision of the polarizer 54 in the optical path between the first coupler 52 and the second coupler 55. The polarizer 54 introduces a single polarization component of the forward light into the sensing loop 56, and the introduced light component is separated into the CW light and the CCW light. After traveling through the sensing loop 56, the CW light and the CCW light are combined into the return light. The polarizer 54 passes only a single polarization component of the return light which corresponds to the selected polarization component of the forward light.

Since the characteristics of the laminated-type polarizer 54 have substantially a negligible variation responsive to a temperature variation, it is possible to suppress a drift in the zero-point level of the output signal from the fiber-optic gyroscope which would be caused by a temperature variation of the characteristics of the polarizer 54.

The depolarizer 58 is of the Lyot fiber type, including two polarization-plane conservative optical fibers having different lengths. The length of the longer optical fiber is twice the length of the shorter optical fiber. The two optical fibers are connected in such a manner that the main axes of the optical fibers incline to each other at an angle of 45 degrees. The depolarizer 58 produces a difference in optical path length between the orthogonal polarization modes, decreasing an interference between the orthogonal polarization modes. In other words, the depolarizer 58 depolarizes the CW light beam and the CCW light beam into natural light beams, removing unnecessary interference noise component caused by a variation in the polarization conditions in the sensing loop 56. As a result, it is possible to further reduce the drift in the output signal from the fiber-optic gyroscope.

Figure 23:
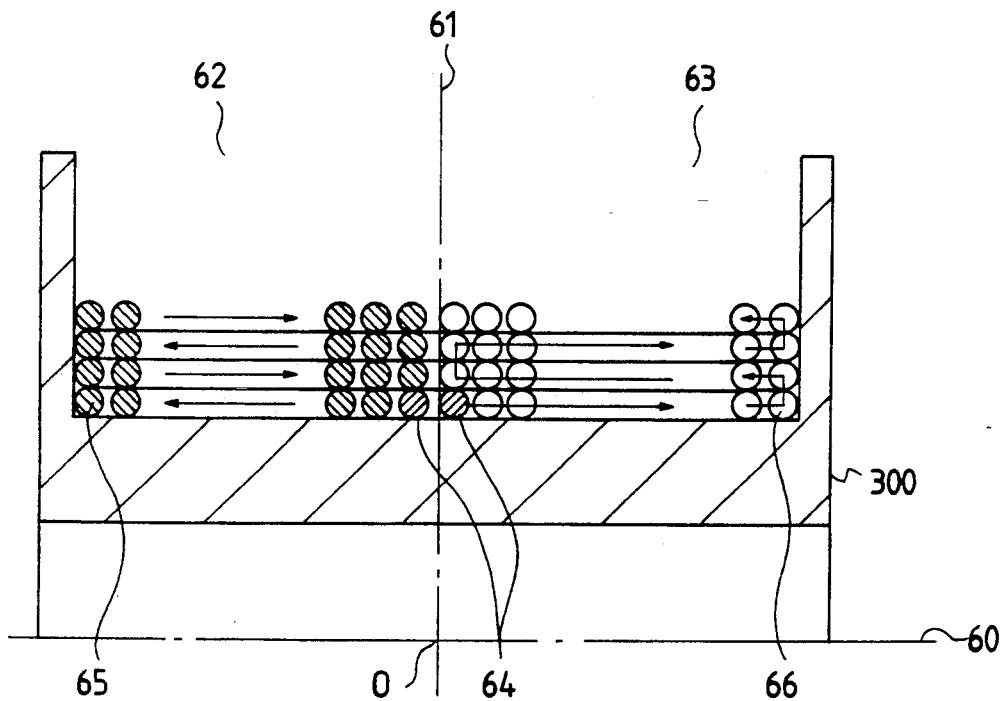
FIG. 23 is a sectional view of a part of the sensing loop arrangement of FIG. 22.

The sensing loop 56 includes an optical fiber of the single-mode type which is wound symmetrically in a multi-layer configuration. As shown in FIG. 23, a sensing loop arrangement includes a bobbin 300. A region extending around the circumferential surface of the bobbin 300 is divided into halves 62 and 63 by a central plane 61 perpendicular to the main axis 60 of the bobbin 300. A central part 64 of a length of a single-mode optical fiber forming the sensing loop 56 is placed on the bobbin 300 around the central plane 61, and is made into a central portion of an innermost winding layer. Halves 65 and 66 of the optical fiber are wound around the bobbin 300 in the regions 62 and 63 respectively. In odd-numbered winding layers, both the halves 65 and 66 of the optical fiber are wound spirally and extend from the central plane 61 toward the ends of the bobbin 300 respectively. In even-numbered winding layers, both the halves 65 and 66 of the optical fiber are wound spirally and extend from the ends of the bobbin 300 toward the central plane 61. In this way, the halves 65 and 66 of the optical fiber are substantially symmetrical with respect to the central plane 61. Furthermore, the sensing loop 56 is in a point symmetry with respect to the point O of the intersection between the main axis 60 and the central plane 61.

The phase modulator 57 provides an optical phase difference between the CW light and the CCW light. The phase modulator 57 includes a cylindrical piezoelectric element, and the optical fiber wound around the piezoelectric element and defining the optical path 18. While passing through the optical path 18 in the phase modulator 57, the CW light and the CCW light are subjected to phase modulation. This phase modulation is to increase the sensitivity in the detection of a Sagnac phase difference between the CW light and the CCW light which is caused by a rotation of the fiber-optic gyroscope.

The optical fibers defining the optical paths 11, 12, 13, 14, 15, 16, 17, and 19 are of the single-mode type. The optical fiber defining the optical path 18 is preferably of the polarization-plane conservative type for the following reason. As the phase modulator 57 receives a phase modulation signal, the piezoelectric element in the phase modulator 57 expands and contracts. The expansion and contraction of the piezoelectric element causes a stress in the optical fiber defining the optical path 18. The stress in the optical fiber unsettles the polarization conditions and the intensity of the light beams. In the case where the depolarizer 58 adequately depolarizes the CW light and the CCW light, the optical fiber defining the optical path 18 may be of the single-mode type.

What is claimed is:

1. An optic rotation sensing apparatus comprising:
   a light source emitting light;
   a sensing loop;
   means for transmitting the light from the light source to the sensing loop;
   a photodetector;
   means for transmitting light from the sensing loop to the photodetector;
   means for modulating a phase of light propagating in the sensing loop; and
   signal controlling/processing means for controlling an output signal of the photodetector at a phase at which an AM noise component of the output signal of the photodetector is minimized;
   the signal controlling/processing means comprising sync detection means for sync-detecting the output signal of the photodetector, a reference signal generator for generating a signal containing a reference signal used in the sync detecting, and control means for varying a phase of the signal generated by the reference signal generator on the basis of the phase at a phase at which the AM noise component of the output signal of the photodetector is minimized so that a signal component of the output signal of the photodetector can be detected by sync detection at a phase at which the AM noise component of the output signal of the photodetector is minimized.

2. The apparatus of claim 1 further comprising a first coupler separating the light emitted from the light source into two light beams, a polarizer, means for transmitting one of the light beams from the first coupler to the polarizer, a second coupler separating light outputted from the polarizer into two light beams, the second coupler being connected to the sensing loop, means for transmitting return light from the sensing loop to the first coupler via the second coupler and the polarizer, the first coupler separating the return light into two return light beams, and means for transmitting one of the return light beams to the photodetector.

3. The apparatus of claim 1 wherein the signal controlling/processing means comprises phase detecting means for detecting a predetermined phase of a harmonic component of the output signal of the photodetector, and means for detecting the signal component of the output signal of the photodetector by sync detection at the phase at which the AM noise component is minimized which is obtained on the basis of the predetermined phase.

4. The apparatus of claim 1 wherein the signal controlling/processing means is operative for controlling the sync detection means so as to detect the signal component of the output signal from the photodetector at the AM noise-minimizing phase by the sync detection.

5. The apparatus of claim 1 wherein the signal controlling/processing means is operative for controlling the phase modulating means so that the sync detection means detects the signal component of the output signal from the photodetector at the AM noise-minimizing phase by the sync detection.

6. The apparatus of claim 1 wherein the signal controlling/processing means is operative for controlling the reference signal generator so that the sync detection means detects the signal component of the output signal from the photodetector at the AM noise-minimizing phase by the sync detection.

7. The apparatus of claim 5 wherein the signal controlling/processing means comprises phase detecting means for detecting a phase, by sync detection, at which a magnitude of the output signal of the photodetector is equal to a predetermined magnitude, and
   means for controlling the phase modulating means so that the signal component of the output signal of the photodetector can be detected by sync detection at the phase at which the AM noise component is minimized which is obtained on the basis of the detected phase.

8. A method comprising the steps of:
   feeding light to a sensing loop;
   modulating a phase of light in the sensing loop;

converting return light outputted from the sensing loop into a corresponding electric signal; and controlling and processing the electric signal at a phase at which a level of an AM noise component of the electric signal is minimized.

9. A method comprising the steps of:

feeding light to a sensing loop;

modulating a phase of light in the sensing loop;

converting return light outputted from the sensing loop into a corresponding electric signal;

detecting a predetermined phase of the electric signal;

detecting a signal component of the electric signal by a sync detection at a phase which is obtained on the basis of the predetermined phase and at which a level of an AM noise component of the electric signal is minimized;

generating a signal including a reference signal used by the sync detection; and varying a phase of the reference signal on the basis of the predetermined phase detected by the phase detecting step, and controlling the sync detection so that the signal component of the electric signal is detected at a phase at which the level of the AM noise component of the electric signal is minimized.

10. The method of claim 9 further comprising the step of depolarizing light in the sensing loop.

11. A method comprising the steps of: feeding light to a sensing loop;

modulating a phase of light in the sensing loop;

converting return light outputted from the sensing loop into a corresponding electric signal;

detecting a predetermined phase of a harmonic component of the electric signal;

detecting a signal component of the electric signal by a sync detection at a phase which is obtained on the basis of the predetermined phase and at which a level of an AM noise component of the electric signal is minimized;

generating a signal including a reference signal used by the sync detection; and varying a phase of the signal generated by the generating step of the basis of the predetermined phase detected by the phase detecting step, and controlling the phase modulating step so that the signal component of the electric signal is detected by the sync detection at a phase at which the level of the AM noise component of the electric signal is minimized.

12. The method of claim 11 further comprising the step of depolarizing light in the sensing loop.

13. A method comprising the steps of:

feeding light to a sensing loop;

modulating a phase of light in the sensing loop;

converting return light outputted from the sensing loop into a corresponding electric signal;

detecting a predetermined phase of a harmonic component of the electric signal;

detecting a signal component of the electric signal by a sync detection at a phase which is obtained on the basis of the predetermined phase and at which a level of an AM noise component of the electric signal is minimized;

generating a signal including a reference signal used by the sync detection; and varying a frequency of the reference signal on the basis of a predetermined phase detected by the phase detecting step, and controlling the signal generating step so that the signal component of the electric signal is detected by the sync detection at a phase at which the level of the AM noise component of the electric signal is minimized.

14. The method of claim 13 further comprising the step of depolarizing light in the sensing loop.

15. A method comprising the steps of feeding light to a sensing loop;

modulating a phase of light in the sensing loop;

converting return light outputted from the sensing loop into a corresponding electric signal;

detecting a predetermined phase at which a magnitude of one electric signal is equal to a predetermined magnitude by a first sync detection, and detecting a phase at which a level of an AM noise component of the electric signal is minimized;

detecting a signal component of the electric signal by a second sync detection at a phase at which a level of an AM noise component of the electric signal is minimized;

generating a signal including a reference signal used by the second sync detection; and varying a phase of the signal generated by one generating step on the basis of the predetermined phase detected by the phase detecting step, and controlling the phase modulating step so that the signal component of the electric signal is detected by the second sync detection at a phase at which the level of the AM noise component of the electric signal is minimized.

16. The method of claim 15 further comprising the step of depolarizing light in the sensing loop.

17. A method comprising the steps of:

feeding light to a sensing loop;

modulating a phase of light in the sensing loop;

depolarizing light in the sensing loop;

converting return light outputted from the sensing loop into a corresponding electric signal; and controlling and processing the electric signal at a phase at which a level of an AM noise component of the electric signal is minimized.

18. The apparatus of claim 17 wherein the depolarizing means comprises two optical fibers of a polarization-plane conservative type, and a length of one of the two optical fibers is equal to twice a length of the other of the two optical fibers, the two optical fibers being connected in a manner such that main axes of the two optical fibers incline to each other at an angle of 45 degrees.

19. An optic rotation sensing apparatus comprising:

a light source emitting light;

a sensing loop;

means for transmitting the light from the light source to the sensing loop;

a photodetector;

means for transmitting light from the sensing loop to the photodetector;

means for modulating a phase of light propagating in the sensing loop;

means for depolarizing light propagating in the sensing loop; and signal controlling/processing means for controlling an output signal of the photodetector at a phase at which an AM noise component of the output signal of the photodetector is minimized;

the signal controlling/processing means comprising sync detection means for sync-detecting the output signal of the photodetector, a reference signal generator for generating a signal containing a reference signal used in the sync detecting, and control means for varying a phase of the signal generated by the reference signal generator on the basis of the phase at a phase at which the AM noise component of the output signal of the photodetector is minimized so that a signal component of the output signal of the photodetector can be detected by sync detection at a phase at which the AM noise component of the output signal of the photodetector is minimized.

20. The apparatus of claim 19 further comprising a first coupler separating the light emitted from the light source into two light beams, a polarizer, means for transmitting one of the light beams from the first coupler to the polarizer, a second coupler separating light outputted from the polarizer into two light beams, the second coupler being connected to the sensing loop, means for transmitting return light from the sensing loop to the first coupler via the second coupler and the polarizer, the first coupler separating the return light into two return light beams, and means for transmitting one of the return light beams to the photodetector.

21. The apparatus of claim 19 wherein the depolarizing means comprises two optical fibers of a polarization-plane conservative type, and a length of one of the two optical fibers is equal to twice a length of the other of the two optical fibers, the two optical fibers being connected in a manner such that main axes of the two optical fibers incline to each other at an angle of 45 degrees.

22. The apparatus of claim 19 wherein the controlling means comprises means for using AM characteristics of the noise component in a predetermined temperature range, and for executing the control at the phase at which the level of the AM noise component is minimized.

23. The apparatus of claim 19 wherein the signal controlling/processing means comprises phase detecting means for detecting a predetermined phase of a harmonic component of the output signal of the photodetector, and means for detecting the signal component of the output signal of the photodetector by sync detection at the phase at which the AM noise component is minimized which is obtained on the basis of the predetermined phase.

24. The apparatus of claim 19 wherein the signal controlling/processing means is operative for controlling the sync detection means so as to detect the signal component of the output signal from the photodetector at the AM noise-minimizing phase by the sync detection.

25. The apparatus of claim 19 wherein the signal controlling/processing means is operative for controlling the phase modulating means so that the sync detection means detects the signal component of the output signal from the photodetector at the AM noise-minimizing phase by the sync detection.

26. The apparatus of claim 19 wherein the signal controlling/processing means is operative for controlling the reference signal generator so that the sync detection means detects the signal component of the output signal from the photodetector at the AM noise-minimizing phase by the sync detection.

27. The apparatus of claim 19 wherein the signal controlling/processing means comprises phase detecting means for detecting a phase, by sync detection, at which a magnitude of the output signal of the photodetector is equal to a predetermined magnitude, and means for controlling the phase modulating means so that the sync detection means detects the signal component of the output signal from the photodetector at the AM noise-minimizing phase by the sync detection.

28. An optic rotation sensing apparatus as recited in claim 19 wherein said means for controlling and processing comprises means for controlling the output signal from the photodetector to have a predetermined phase angle at which the level of the noise component is minimized.

29. An optic rotation sensing apparatus comprising:
a light source emitting light;
a first coupler separating the light emitted from the light source into two light beams, the first coupler including single-mode optical fibers;
a laminated-type polarizer;
means for transmitting one of the light beams to the polarizer;
a second coupler separating light outputted from the polarizer into two light beams, the second coupler including single-mode optical fibers;
a sensing loop having a point-symmetrical configuration and including a single-mode optical fiber;
means for transmitting one of the light beams from the second coupler to the sensing loop;
a photodetector;
means for transmitting return light from the sensing loop to the first coupler via the second coupler and the polarizer, wherein the polarizer separates the return light into two return light beams;
means for transmitting one of the two return light beams from the first coupler to the photodetector;
means for modulating a phase of light propagating in the sensing loop, the modulating means including a cylindrical piezoelectric element and an optical fiber of a polarization-plane conservative type which is wound on the piezoelectric element;
means for depolarizing light propagating in the sensing loop, the depolarizing means including two optical fibers of a polarization-plane conservative type, wherein a length of one of the two optical fibers of the depolarizing means is equal to twice a length of the other of the two optical fibers of the depolarizing means, and wherein the two optical fibers of the depolarizing means are connected in a manner such that main axes of the two optical fibers incline to each other at an angle of 45 degrees; and
signal controlling/processing means for controlling an output signal of the photodetector at a phase at which an AM noise component of the output signal of the photodetector is minimized;
the signal controlling/processing means comprising sync detection means for sync-detecting the output signal of the photodetector, a reference signal generator for generating a signal containing a reference signal used in the sync detecting, and control means for varying a phase of the signal generated by the reference signal generator on the basis of the phase at a phase at which the AM noise component of the output signal of the photodetector is minimized so that a signal component of the output signal of the photodetector can be detected by sync detection at a phase at which the AM noise component of the output signal of the photodetector is minimized.

30. The apparatus of claim 29 wherein the controlling means comprises means for using AM characteristics of the noise component in a predetermined temperature range, and for executing the control at the phase at which the level of the AM noise component is minimized.

* * * * *